US012620509B2

(12) United States Patent
Eggiman et al.

(10) Patent No.: US 12,620,509 B2
(45) Date of Patent: May 5, 2026

(54) CABLE ALIGNMENT APPARATUS AND METHOD FOR ALIGNING ASSEMBLED CABLE ENDS OF TWO CABLES OF A CABLE HARNESS IN THE CORRECT ROTATIONAL POSITION AS WELL AS ARRANGEMENT FOR ASSEMBLING PLUG HOUSINGS WITH CABLE ENDS WITH THE CABLE ALIGNMENT APPARATUS

(71) Applicant: Komax Holding AG, Dierikon (CH)

(72) Inventors: Reto Eggiman, Emmen (CH); Pascal Suter, Hünenberg (CH); Pietro Fiorentino, Ebikon (CH)

(73) Assignee: KOMAX HOLDING AG, Dierikon (CH)

( * ) Notice: Subject to any disclaimer, the term of this patent is extended or adjusted under 35 U.S.C. 154(b) by 531 days.

(21) Appl. No.: 18/153,392

(22) Filed: Jan. 12, 2023

(65) Prior Publication Data

US 2023/0230728 A1 Jul. 20, 2023

(30) Foreign Application Priority Data

Jan. 19, 2022 (EP) .................................... 22152286

(51) Int. Cl.

| | |
|---|---|
| ***H01B 13/012*** | (2006.01) |
| ***D07B 7/16*** | (2006.01) |
| ***H01B 13/02*** | (2006.01) |

(52) U.S. Cl.

CPC ....... *H01B 13/01209* (2013.01); *D07B 7/162* (2013.01); *H01B 13/0207* (2013.01)

(58) Field of Classification Search

CPC .......... H01B 13/01209; H01B 13/0207; D07B 7/162; B21F 15/04

(Continued)

(56) References Cited

U.S. PATENT DOCUMENTS

| | | | | |
|---|---|---|---|---|
| 3,273,605 | A * | 9/1966 | Ferrara, Jr. | B21F 15/04 140/149 |
| 7,870,662 | B2 * | 1/2011 | Imai | H01R 43/20 29/748 |

(Continued)

FOREIGN PATENT DOCUMENTS

| | | | | |
|---|---|---|---|---|
| DE | 19631770 | A1 * | 2/1998 | H01B 13/0207 |
| DE | 102022132908 | B3 * | 12/2023 | H01R 43/28 |

(Continued)

*Primary Examiner* — Jason L Vaughan

(74) *Attorney, Agent, or Firm* — Shumaker, Loop & Kendrick, LLP

(57) ABSTRACT

A dual cable alignment apparatus (10) for rotationally aligning assembled cable ends of two cables (3,4) of a twisted cable harness (2), the cable alignment apparatus (10) comprising two clamping jaws (7,8) and a central web (9) disposed between the clamping jaws (7,8). Each of the two clamping jaws (7,8), which can be moved towards one another in the closing direction (s), can clamp a cable (3,4) between the central web (9) and the clamping jaws (7,8). The clamping jaws (7,8) are further designed to be movable laterally past the central web (9) for changing the rotational position by rolling the cable (3,4) clamped between them. The clamping jaws (7,8) can be moved independently of one another in the lateral direction by means of their own lateral drives (16,17), ensuring that each cable (3,4) can be brought precisely and reliably into the desired rotational position.

10 Claims, 17 Drawing Sheets

(58) Field of Classification Search
USPC .......... 29/747–755; 140/149, 118, 115, 93.6, 140/119
See application file for complete search history.

(56) References Cited

U.S. PATENT DOCUMENTS

| | | | | |
|---|---|---|---|---|
| 10,046,380 | B2 * | 8/2018 | Keil | H01B 13/0207 |
| 10,723,584 | B2 * | 7/2020 | Estermann | D07B 7/169 |
| 11,340,575 | B2 * | 5/2022 | Helmick | G05B 19/19 |
| 11,833,574 | B2 * | 12/2023 | Faccenda | H01B 13/02 |
| 12,142,391 | B2 * | 11/2024 | Drab | H01B 13/0271 |
| 12,354,765 | B2 * | 7/2025 | Straessle | H01B 13/02 |
| 2003/0079342 | A1 * | 5/2003 | Revel | H01R 43/20<br>29/33 F |
| 2009/0241314 | A1 * | 10/2009 | Watanabe | H01B 13/0271<br>29/33 F |
| 2018/0093849 | A1 * | 4/2018 | Estermann | D07B 7/169 |
| 2020/0248842 | A1 * | 8/2020 | Seeholzer | H01R 43/28 |
| 2023/0132636 | A1 * | 5/2023 | Drab | H01B 13/0207<br>140/149 |
| 2024/0257997 | A1 * | 8/2024 | Fiorentino | H01R 43/20 |

FOREIGN PATENT DOCUMENTS

| | | | |
|---|---|---|---|
| EP | 1304773 | A1 | 4/2003 |
| EP | 3301768 | A1 | 4/2018 |

* cited by examiner

CABLE ALIGNMENT APPARATUS AND METHOD FOR ALIGNING ASSEMBLED CABLE ENDS OF TWO CABLES OF A CABLE HARNESS IN THE CORRECT ROTATIONAL POSITION AS WELL AS ARRANGEMENT FOR ASSEMBLING PLUG HOUSINGS WITH CABLE ENDS WITH THE CABLE ALIGNMENT APPARATUS

FIELD

The invention relates to a cable alignment apparatus for aligning assembled cable ends of two cables of a cable harness in the correct rotational position. Furthermore, the invention relates to an arrangement for handling cables and for assembling plug housings with cable ends that have been aligned by means of such a cable alignment apparatus, as well as to a method for aligning assembled cable ends in the correct rotational position.

BACKGROUND

Cable harnesses such as those used in automobiles or aircraft consist of several cables, which are provided with plug housings at their prefabricated cable ends. For this purpose, the prefabricated cable ends, i.e. the cable ends that are cut to length, stripped and provided with contact elements (for example crimp contacts), are inserted into chambers or receivers of the plug housing. As a rule, the cables of a cable harness with the cable ends to be assembled are present individually and are also individually introduced into the chambers of the plug housing by means of corresponding mechanical devices. More and more cable harnesses consist of two or several cable strands made from a plurality of cables, mainly twisted cables, for which there is also a need to assemble the free, in particular untwisted, and optionally elongated cable ends of the cable harness. Twisted pair cables such as so-called UTP cables (UTP: Unshielded Twisted Pair) provide greater protection against electrical and magnetic interference compared to untwisted pairs and are characterized by particularly good transmission qualities of signals. In addition to twisted cables, untwisted cables of cable harnesses or other multi-cable systems, in which the cables are only arranged side by side and combined in a group, can be used as well.

Corresponding mechanical devices known to the person skilled in the art as cable assembling stations are used for the automatic assembling of plug housings with cable harnesses consisting of two cables. The two contact elements must be in the correct rotational position (angular position around the longitudinal cable axis) to fit and be inserted into cells of a plug housing, which makes automatic assembling of plug housings with cables challenging. In order to take advantage of UTP cables, the untwisted areas of the cable ends should be as short as possible. The alignment of such short cable ends of the twisted pair in the correct rotational position is particularly demanding.

A cable alignment apparatus for aligning assembled cable ends of two cables of a twisted cable harness in the correct rotational position has become known from EP 3 301 768 A1. In this cable alignment apparatus, the cable ends can be rotated by means of a rotary gripping apparatus that applies pressure to the cable harness at the twisted cable area. An optical detection apparatus for determining the rotational position of the cables verifies the alignment of the contact elements. Such an optical detection apparatus has already been described in EP 1 304 773 A1. The cable alignment apparatus in accordance with EP 3 301 768 A1 further comprises cable grippers arranged one behind the other at the portion of the untwisted cable end in the longitudinal direction of the longitudinal axis. The cable grippers are set up to fix only one cable at a time at the cable end and to guide the cable end of the other cable. If one cable end is in the correct rotational position by turning the cable harness at the twisted cable area, it is fixed by the relevant cable gripper, while the other cable end is only guided by the cable gripper. Once both contact elements are correctly oriented, the actual assembly process can begin. The orientation process of this cable alignment apparatus is evidently performed in several steps.

SUMMARY

It is therefore an object of the present invention to avoid the disadvantages of what is known and, in particular, to provide an improved cable alignment apparatus for aligning assembled cable ends of two cables of a twisted cable harness in the correct rotational position, which apparatus can be operated in particular efficiently.

This object is solved according to the invention by means of a cable alignment apparatus for aligning assembled cable ends of two cables of a cable harness, in particular a twisted cable harness, in the correct rotational position, having the features of claim 1. This cable alignment apparatus is also referred to below as a dual cable alignment apparatus for the sake of simplicity. The dual cable alignment apparatus comprises two clamping jaws and a central web arranged between the clamping jaws, wherein a respective cable can be clamped between the central web and one of the clamping jaws. The clamping jaws can be two clamping jaws that can be moved towards one another in the closing direction to create a closed position. In the closed position, the respective cable is clamped between the clamping jaws and the central web. Preferably, in the closed position, the two cables have an approximately axis-parallel course with respect to their cable ends. To change the rotational position, at least one of the clamping jaws, and preferably both, can be moved laterally past the central web in such a manner that the respective rotational position of the cable can be changed by rolling as it passes. In this context, lateral refers to a direction that is transverse and preferably at right angles to the longitudinal axis of the cable alignment apparatus as well as transverse and preferably at right angles to the closing direction of the cable alignment apparatus. When the cable extends along a longitudinal axis, the cable clamped between the clamping jaws and the central web rotates around its longitudinal cable axis. In other words, moving the engagement means (clamping jaws, central web) past one another causes a rolling motion of the cable clamped between them. Such rolling is particularly possible with round cables, i.e. cables with a more or less circular outer contour.

With the dual cable alignment apparatus, assembled cable ends can be aligned efficiently and quickly. In particular, this dual cable alignment apparatus makes it possible to align both cables or cable ends at the same time, which significantly reduces the process time for alignment in the correct rotational position. The contact elements attached to the cable ends can thus be easily and precisely brought into the correct rotational position. This also creates the basis for the cable ends with the contact elements to be easily inserted into cells of a plug housing. The mentioned rotational position can be determined by an angle around the cable longitudinal axis. The angle indicates by how much the cable would have to be rotated around its longitudinal axis from its actual position to reach its nominal position.

When the cable extending along the longitudinal axis in the closed position is clamped between the central web and one of the clamping jaws, the lateral traversing procedure can be started. If both assembled cable ends are to be aligned, both clamping jaws can be moved simultaneously. However, other modes of operation are also conceivable. Thus, only one of the clamping jaws can be moved first and only after the respective first cable end has reached the correct rotational position, the other clamping jaw is moved to adjust the second cable end. It is also conceivable that only one of the clamping jaws is moved in the lateral direction. For example, if one of the assembled cable ends specifies a reference position to which the cable end of the other cable is aligned.

The dual cable alignment apparatus can have at least one feeding drive For closing, i.e. for creating the closed position, and preferably also for opening the clamping jaws. If only one feeding drive is used, the clamping jaws can be connected to one another by gears in such a manner that both clamping jaws can be moved with the feeding drive. However, it is advantageous if a separate feeding drive is provided for each clamping jaw. This design even allows processing of cables with different thicknesses. The respective feeding drive can, for example, be pneumatic or electromechanical.

The two clamping jaws are preferably positioned one above the other or next to one another in relation to the longitudinal axis at least in an initial or open position and after completion of the closing process, i.e. in the closed position before lateral movement. The clamping jaws positioned in this manner are consequently arranged to overlap or cover one another, as seen in the direction of closing.

The central web can be arranged in a fixed position in the cable alignment apparatus at least temporarily, in particular at least during the lateral motion for changing the rotational position.

A separate lateral drive can be provided for the at least one laterally movable clamping jaw, whereby the clamping jaws can be moved laterally independently of one another by means of their own drives. The respective lateral drive can be controlled individually. Preferably, two lateral drives are provided, wherein one individually controllable lateral drive is assigned to each clamping jaw. This ensures that each cable is precisely and reliably brought into the desired rotational position. The lateral drive can have a threaded rod drive. Furthermore, linear guides can be provided for precise guidance of the clamping jaws for the lateral method.

An advantageous dual cable alignment apparatus results when the clamping jaws and the central web each have clamping surfaces running parallel to one another. The clamping surfaces can be flat. Profiled clamping surfaces can be provided to ensure reliable rolling motion during lateral methods. These clamping surfaces can be provided with profiling, preferably formed by grooves or slots.

The grooves or slots of the profiling may form a pattern with a plurality of parallel lines. Two groups of parallel lines that intersect to form a diamond-shaped pattern are also conceivable.

The grooves or slots of the profiling can be arranged extending transversely to the longitudinal axis and preferably extending diagonally on the clamping surfaces. It may be particularly preferred if the grooves or slots associated with the respective clamping jaws are oriented transversely and preferably at right angles to the grooves or slots associated with the central web.

The clamping jaws and central web may have elastomer coatings to increase friction to form advantageous clamping surfaces. Such coated engagement means can ensure slip-free rolling even of a cable whose outer sheath is smooth and difficult to handle. Alternatively, the clamping jaws and the central web, particularly if they are made of metallic materials, can be roughened in the area of the clamping surfaces to increase friction.

The central web may have an inlet portion tapering toward the rear end. The rear end is the end facing the twisted area of the cable harness. The tapered inlet portion provides an inlet geometry for the two cables of the cable ends. This inlet portion connects at the rear to a clamping portion comprising the clamping surfaces. The inlet portion can be formed, for example, by bevels in the central web. The two cables of the cable ends can rest against the bevels and form a kind of cable triangle.

It can be advantageous if the central web is replaceable and preferably automatically replaceable for greater variability of the cable alignment apparatus.

A further embodiment relates to a cable alignment apparatus in which the central web has web segments separated from one another in a step-like manner for selectively presetting different clamping surfaces. The clamping surfaces of the individual web segments can be spaced at different distances from one another. This allows different cables to be processed with the same device. This central web is thus shaped as a stepped column in relation to the web axis. The central web with the web segments, which are separated from one another in levels, can be moved in levels between the clamping jaws by means of an adjusting apparatus, depending on the selected level.

At least one clamping segment of the central web can have grooves or slots to form a profile on the contact surfaces. The grooves or slots of the central web can cooperate with corresponding grooves or slots of the clamping jaws in such a manner that, during a lateral motion, the clamping jaws and the central web can be retracted in a partially interlocking manner in such a manner that the next larger level does not impede the motion of the clamping jaw.

The clamping jaws and/or the central web can be equipped with sensors for detecting the torsional moment applied to the clamped cable, which makes it easy to detect torsion of the cable and prevent unwanted torsion. Such sensors are particularly helpful when handling very thin cables, as such cables must not be twisted too much. Force sensors that measure in the lateral direction (z direction) are preferably used as sensors.

Furthermore, the dual cable alignment apparatus may comprise a detection apparatus for determining the respective rotational position of the assembled cable ends. The detection apparatus may preferably be an optical detection apparatus.

Preferably, the rotational positions of the cable ends are determined at least before the start of the alignment procedure. Based on the knowledge of the actual condition, it is possible to calculate to what extent the cable must be rotated. The distance required for the lateral travel motion can be determined by calculation, taking into account the cable diameter. Preferably, after the first adjustment, the lateral method is used to check whether the rotational position has actually assumed the nominal position. Otherwise, the readjustment procedure must be repeated again. Alternatively, it is also conceivable that the rotational position is monitored permanently or at least during the entire alignment procedure. A cable end monitored in this manner allows control without prior calculation of the required traversing path, in which the clamping jaw is continuously traversed laterally and the traversing procedure is stopped when the correct rotational position is present.

For example, the optical detection apparatus may comprise a camera.

The optical detection apparatus may alternatively be or comprise a scanning unit or image capture module with at least one line sensor. The assembled cable ends are preferably inserted into the image acquisition module before the alignment procedure begins.

A further aspect of the invention relates to an arrangement for handling cables, having a cable alignment apparatus for aligning assembled cable ends of two cables of a cable harness, in particular a twisted cable harness, in the correct rotational position, in particular the dual cable alignment apparatus described above, and having an assembly gripping unit with two individually controllable cable grippers for gripping the assembled cable ends of the cables, which are aligned in the correct rotational position, and for feeding the assembled cable ends to plug housings. Assembling can be done exemplarily in a plug housing with two cells. However, two plug housings are also conceivable, into each of which the respective cable ends are inserted.

The two clamping jaws and the central web of the dual cable alignment apparatus can also be used for assembling, if necessary, in that the two clamping jaws and the central web assume the functions of cable grippers. This can be done, for example, by making the central web divisible or consisting of two parts, and by allowing the web halves or parts separated by division to cooperate in each case with the associated clamping jaws to create individual gripping units in such a manner that they can each be moved more or less individually to plug housings for the assembling procedure.

Subsequently, the invention relates to a method for the rotationally correct alignment of assembled cable ends of two cables of a cable harness, in particular a twisted cable harness, preferably using the cable alignment apparatus described above. The method is characterized in that each of the cables is clamped between engagement means, and in that the clamped cables are caused to undergo a cable rolling motion by the engagement means moving past one another, thereby changing the rotational position of the assembled cable ends of the cables and thus aligning the respective assembled cable end. The engagement means are preferably the clamping jaws mentioned at the beginning and the central web.

In one embodiment, the engagement means are moved past one another until the desired rotational position of the respective assembled cable end is reached.

It is advantageous if only one of the engagement means is moved per cable and the other engagement means is stationary or remains stationary. The latter engagement means can be formed by a common component centered between two laterally movable engagement means.

The rotational position of the assembled cable ends can be monitored by means of an optical detection apparatus that uses a shadow image of the contact elements to detect the position. The shadow image is preferably generated from the shadow width or shadow contour of the contact elements and the angle of rotation of a scanning unit of the optical detection apparatus.

A particularly advantageous method is obtained when the rotational position of the assembled cable ends is monitored by means of the optical detection apparatus, which uses a shadow image of the two contact elements of the cable ends for position detection, wherein, when determining the rotational position of the assembled cable ends, the area of the shadow image at which an overlap of the shadow contours of the two contact elements occurs is excluded from the examination.

Furthermore, it can be advantageous if the assembled cable ends are pre-aligned and only then the rotational position of the assembled cable ends is determined for the first time by means of the optical detection apparatus. The process time for performing the alignment procedure can thus be reduced even further. For example, an operator can perform the pre-alignment manually.

The cable rolling motion caused by the engagement means passing one another can cause the cable ends to be spaced farther apart. This aspect can be useful. For example, the cable ends of cable grippers, which are now further apart, can be grasped more easily. The cable ends can be at approximately the same heights in the closed position or at the start of the alignment procedure. The assembled cable ends may have different heights during or after the alignment procedure. The fully aligned assembled cable ends can each be gripped by cable grippers at the different heights and brought to the desired location for assembling, e.g. in cells of a plug housing.

DESCRIPTION OF THE DRAWINGS

Further individual features and advantages of the invention can be derived from the following description of embodiments and from the drawings. In said drawings.

DETAILED DESCRIPTION

Figure 1:
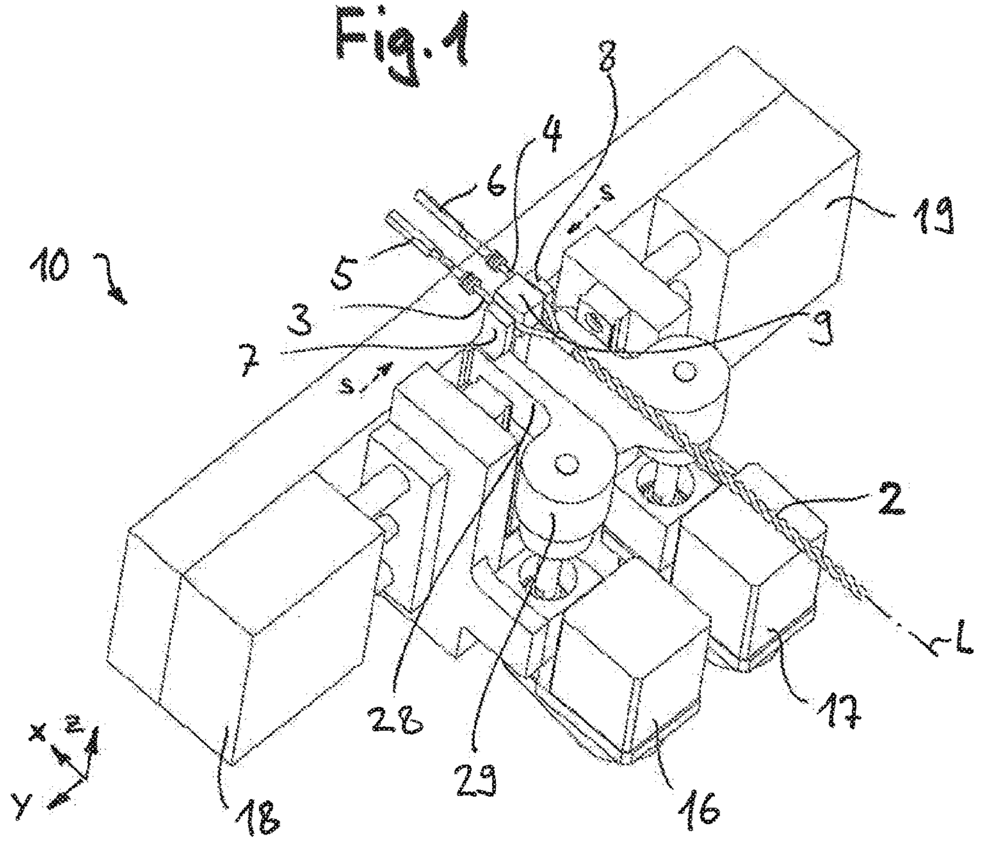
FIG. 1 shows a perspective view of a dual cable alignment apparatus according to the invention for aligning the assembled cable ends of two cables of a twisted cable harness with a central web and two clamping jaws in a closed position.

FIG. 1 shows a cable alignment apparatus 10 for aligning the cable ends of two cables 3, 4 of a twisted cable strand 2 extending along a longitudinal axis L in the correct rotational position. Therefore, for simplicity, the term "dual cable alignment apparatus" is also used below for the cable alignment apparatus 10 handling two cables 3, 4. The respective cable is usually an electrical cable containing, for example, a solid conductor made of copper or steel or stranded wire and insulation as a sheath for the conductors.

The Cartesian coordinate system shown in FIG. 1 is used to assist in understanding the directions and major motions of the components of the dual cable alignment apparatus 10. The dual cable alignment apparatus 10 comprises two clamping jaws 7 and 8 movable transversely to the longitudinal axis L, in opposite directions between an initial or open position and a closed position in the y-direction. The longitudinal axis L also corresponds to the direction in which the respective longitudinal cable axes of the cable ends of cables 3, 4 extend. The closing motion for creating the closed position is indicated by arrows s. The dual cable alignment apparatus 10 further comprises a central web 9 arranged between the clamping jaws 7, 8. In the closed position shown in FIG. 1, the two cables 3, 4 extending approximately parallel to the axis are held in place by the cable alignment apparatus 10. One cable 3, 4 is clamped between the central web 9 and one of the clamping jaws 7, 8.

The cable alignment apparatus 10 shown here is used in particular with regard to the subsequent assembling of plug housings with assembled cable ends. In this example, crimp contacts are attached as contact elements 5, 6 to the respective stripped cable ends of the twisted cable harness 2.

Figure 2:
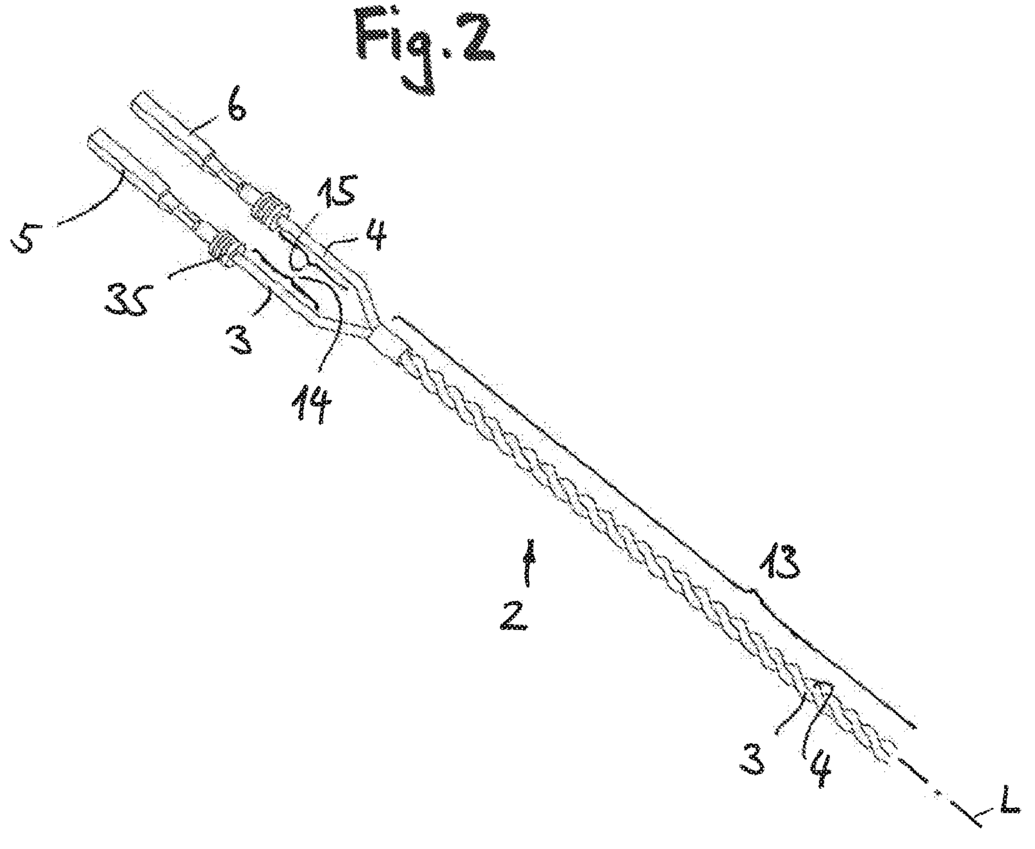
FIG. 2 shows a perspective view of the twisted cable harness with the assembled cable ends aligned.

As can be seen from FIG. 1, the assembled cable ends of cables 3, 4 are not aligned and are skewed with respect to the vertical and horizontal. The dual cable alignment apparatus 10 described in detail below can be used to align the cable in the correct rotational position. FIG. 2 shows a cable harness 2 with the assembled cable ends of the cables 3, 4 aligned in this manner, but with the cable ends with the contact elements 5, 6 lying on a common horizontal plane.

The twisted pair cable harness 2 shown in FIG. 2 is a so-called UTP cable. Contact elements 5, 6 with rectangular or diamond-shaped outer contours in cross-section are attached to the free ends of the cables 3, 4. However, the contact elements 5, 6 could also have other shapes that are non-circular in cross-section. Round contact elements usually do not require alignment of their rotational position. Further, grommets 35 are attached to the ends of the cables 3, 4 by way of example. Of course, grommets can also be dispensed with as required. The twisted area of the cable harness 2 is designated by 13. The short untwisted area with the assembled cable ends of cables 3, 4 adjoins this twisted area 13 at the front. Areas of the cables 3, 4 in which the clamping jaws 7, 8 and the central web 9 act on the respective cable are designated by 14, 15. However, the dual cable alignment apparatus 10 can also be used to process untwisted cable harnesses composed of two cables.

Figure 3A:
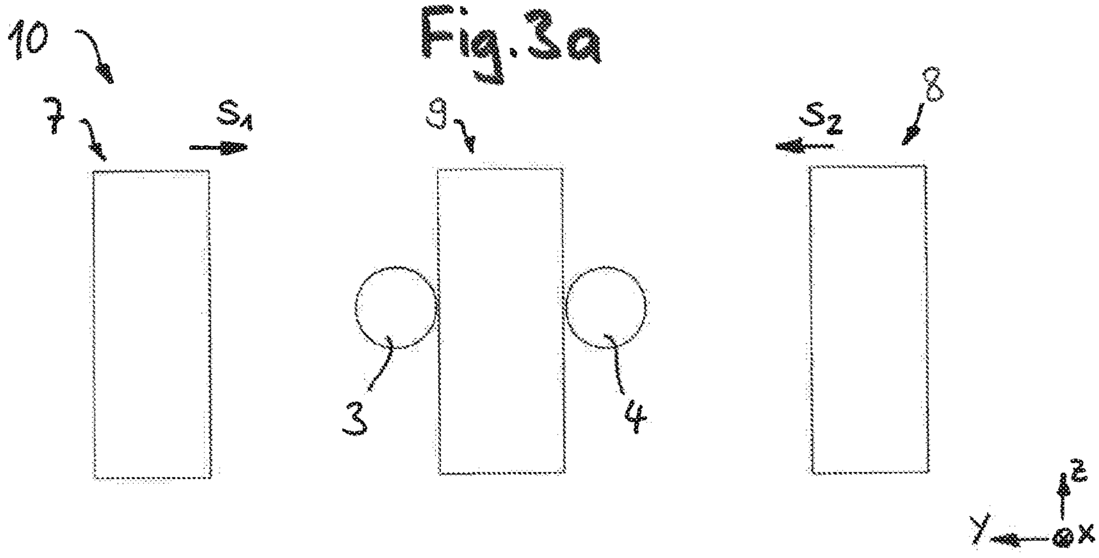
FIGS. 3*a*-3*c* show schematic front views of a dual cable alignment apparatus according to the invention, each corresponding to individual work steps.
Figure 3B:
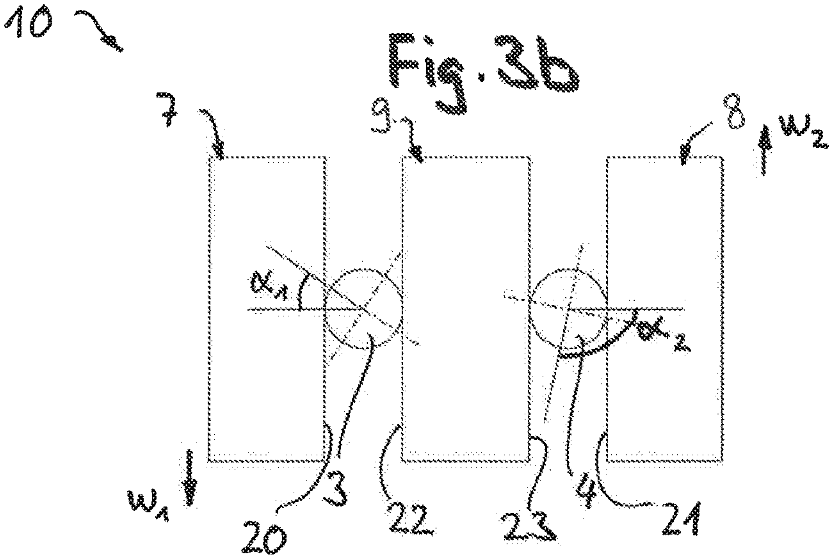
Figure 3C:
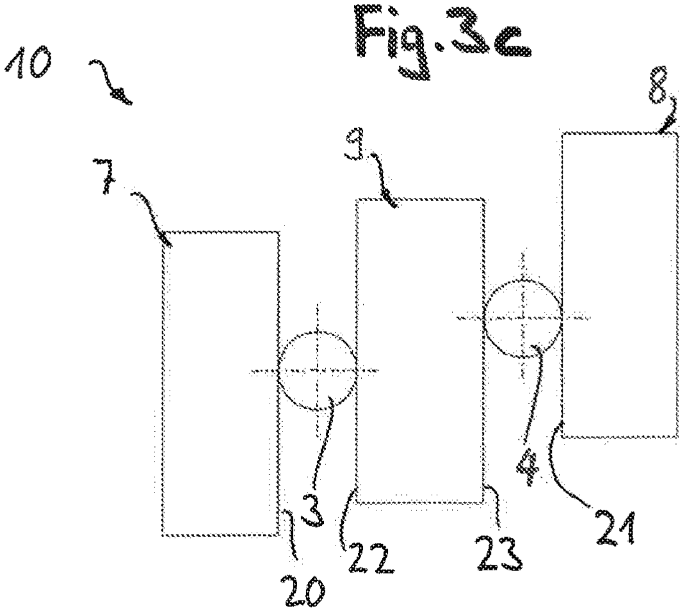

The basic structure and operation of the dual cable alignment apparatus 10 can be seen in FIGS. 3*a* to 3*c*. FIG. 3*a* shows the dual cable alignment apparatus 10 in an initial position. In this position, the cable ends of the cable harness can be inserted into the dual cable alignment apparatus 10. One cable 3, 4 each is then located between one of the clamping jaws 7, 8 and the centrally arranged central web 9. The two clamping jaws 7, 8 are then moved towards one another by means of feeding drives (not shown here). The corresponding closing directions or motions are indicated by arrows s1 and s2. For closing the clamping jaws 7, 8, it is advantageous to provide two feeding drives in such a manner that the feeding can be performed individually for each clamping jaw 7, 8. This also has the advantage that cables of different thicknesses can be processed if necessary. FIG. 3*b* shows the situation after infeed. In the closed position, the cables 3, 4 are each clamped between the central web 9 and one of the clamping jaws 7, 8.

After creating the closed position, the assembled cable ends of cables 3, 4 are usually not yet in the correct rotational position. The corresponding misalignments are indicated in FIG. 3*b* with angles $\alpha_1$ and $\alpha_2$. For alignment, the clamping jaws 7, 8 are now moved in lateral direction, while the central web 9 remains stationary. The corresponding lateral motion of the clamping jaws 7, 8 is indicated by arrows $w_1$ and $w_2$. In the case shown here, the clamping jaws 7, 8 perform a motion in opposite directions, but not coupled. However, depending on the misalignment and the desired nominal position, motions in the same direction are also conceivable. Under certain circumstances, only one of the clamping jaws 7, 8 is moved.

The clamping jaws 7, 8 and the central web 9 each have clamping surfaces 20, 21, 22, 23 extending parallel to one another. The clamping surfaces 20, 21, 22, 23 are, for example, flat. As the engagement means 7, 9; 8, 9 move past one another, the clamped cables 3, 4 are set into a cable rolling motion. In order to enable the cable rolling motion, the cables have an outer contour which is approximately circular in cross-section and is predetermined by the cable sheath, for example. The opposing clamping surfaces 20, 22; 21, 23 each provide a kind of path along which the cables can roll. The cable 3 rolls downwards when the clamping jaw 7 is moved laterally in the $w_1$ direction. The cable 4 rolls upwards when the clamping jaw 8 is moved laterally in the $w_2$ direction. After the lateral method, the situation shown in FIG. 3*c* is obtained, in which the misalignments of the assembled cable ends of cables 3, 4 are eliminated. Obviously, cables 3, 4 are now no longer at the same height. As a result of the cable rolling movements, cables 3, 4 are displaced upwards or downwards.

The lateral motion by which the respective clamping jaws 7, 8 must be moved up or down depends substantially on the angle α1, α2. These angles can be detected using detection apparatuses to determine the rotational position of the cables. Such detection apparatuses are explained in more detail below. The cable diameter is often known in advance and does not necessarily have to be recorded specifically. Based on the knowledge of the actual condition, as on the basis of the angle value $\alpha_1$, $\alpha_2$, it can be calculated, taking into account the cable diameter, to what extent the cable must be rotated and consequently how large the traversing path required for this must be.

Figure 4A:
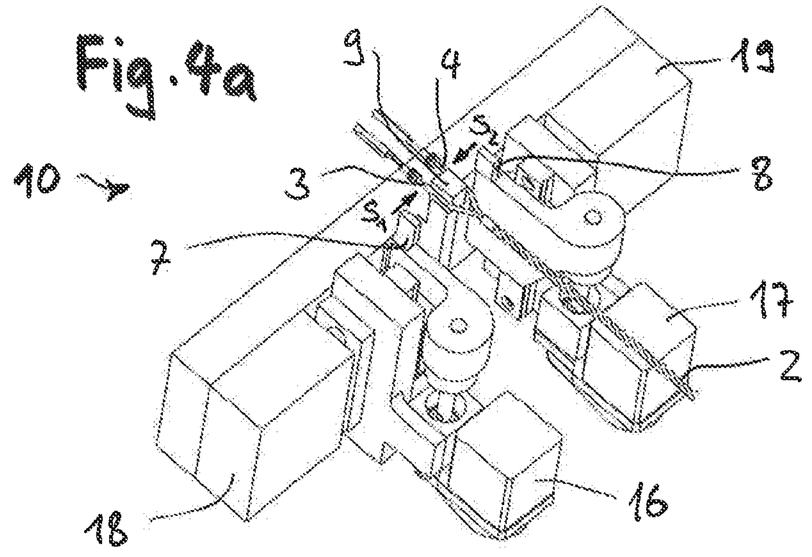
FIG. 4*a-c* shows perspective views of the dual cable alignment apparatus of FIG. 1 during individual work steps.
Figure 4B:
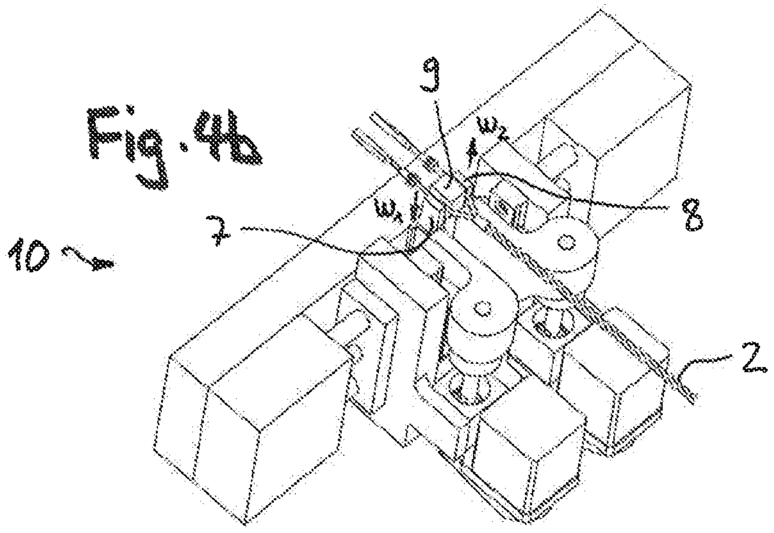
Figure 4C:
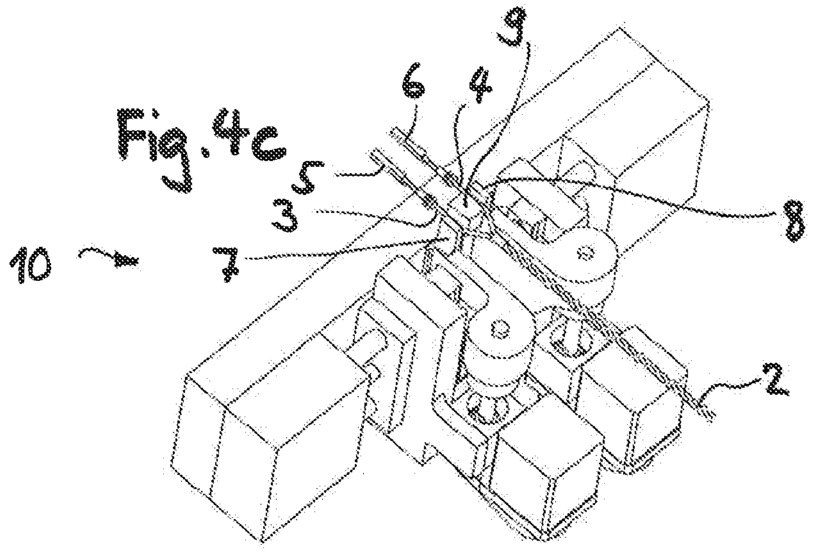

FIGS. 4*a* to 4*c* show the dual cable alignment apparatus 10 of FIG. 1 in the same positions as in FIGS. 3*a*-3*c*. FIG. 1 and FIGS. 4*a* to 4*c* also show the respective motions for moving the individual components. Feeding drives for closing and opening the clamping jaws 7, 8 are designated as 18, 19. The feeding drive 18, which is pneumatic or electromechanical, for example, moves the clamping jaw 7 for feeding in the $s_1$ direction, and the feeding drive 19 moves the clamping jaw 8 for feeding in the $s_2$ direction (FIG. 4*a*). The two clamping jaws 7, 8 are designed to move laterally past the central web 9 by means of lateral drives 16, 17 in order to change the rotational position of the assembled cable ends of the cables 3, 4. Each clamping jaw 7, 8 is assigned its own individually controllable lateral drive 16, 17 for lateral motion. The clamping jaws 7, 8 can be moved independently of one another in the $w_1$ and $w_2$ directions by means of their own drives 16, 17. This ensures that each cable 3, 4 is precisely and reliably brought into the desired rotational position. The lateral drives 16, 17 are exemplarily designed as threaded rod drives with threaded rods 36. Other linear drives such as those with linear motors can also be used for the lateral drives 16, 17. Pneumatic or hydraulic lateral drives are also conceivable.

The clamping jaws 7, 8 and the central web 9 have flat clamping surfaces for applying pressure to the cables 3, 4. To increase friction, the clamping jaws 7, 8 and the central web 9 can have coatings made of an elastomer, in such a manner that advantageous clamping surfaces are created which allow the cables 3, 4 to roll without slippage. As an alternative to coating, it is also conceivable to roughen the clamping jaws 7, 8 and the central web 9 made of metallic materials in the area of their clamping surfaces, which can also increase the friction for optimum cable rolling motions.

Figure 5:
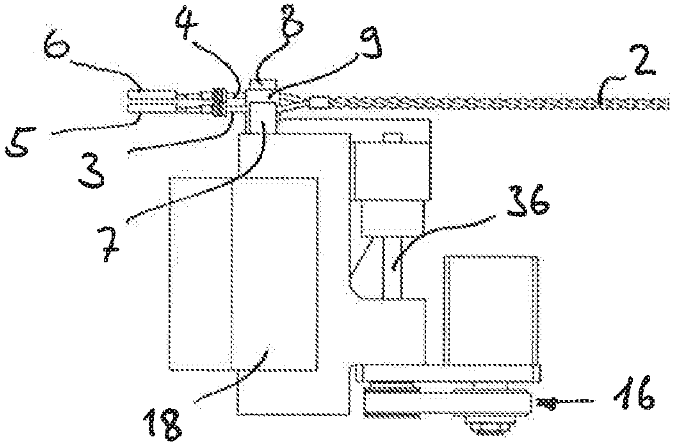
FIG. 5 shows a side view of the dual cable alignment apparatus shown in FIG. 1 with the assembled cable ends fully aligned.
Figure 6:
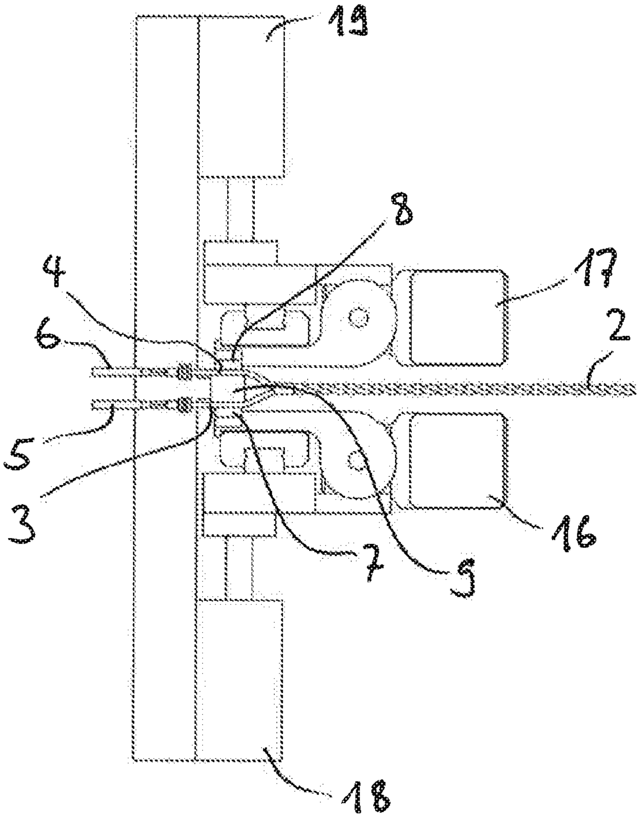
FIG. 6 shows a top view of the dual cable alignment apparatus.

Further design details of the dual cable alignment apparatus 10 can be seen in FIGS. 5 and 6.

Figure 7:
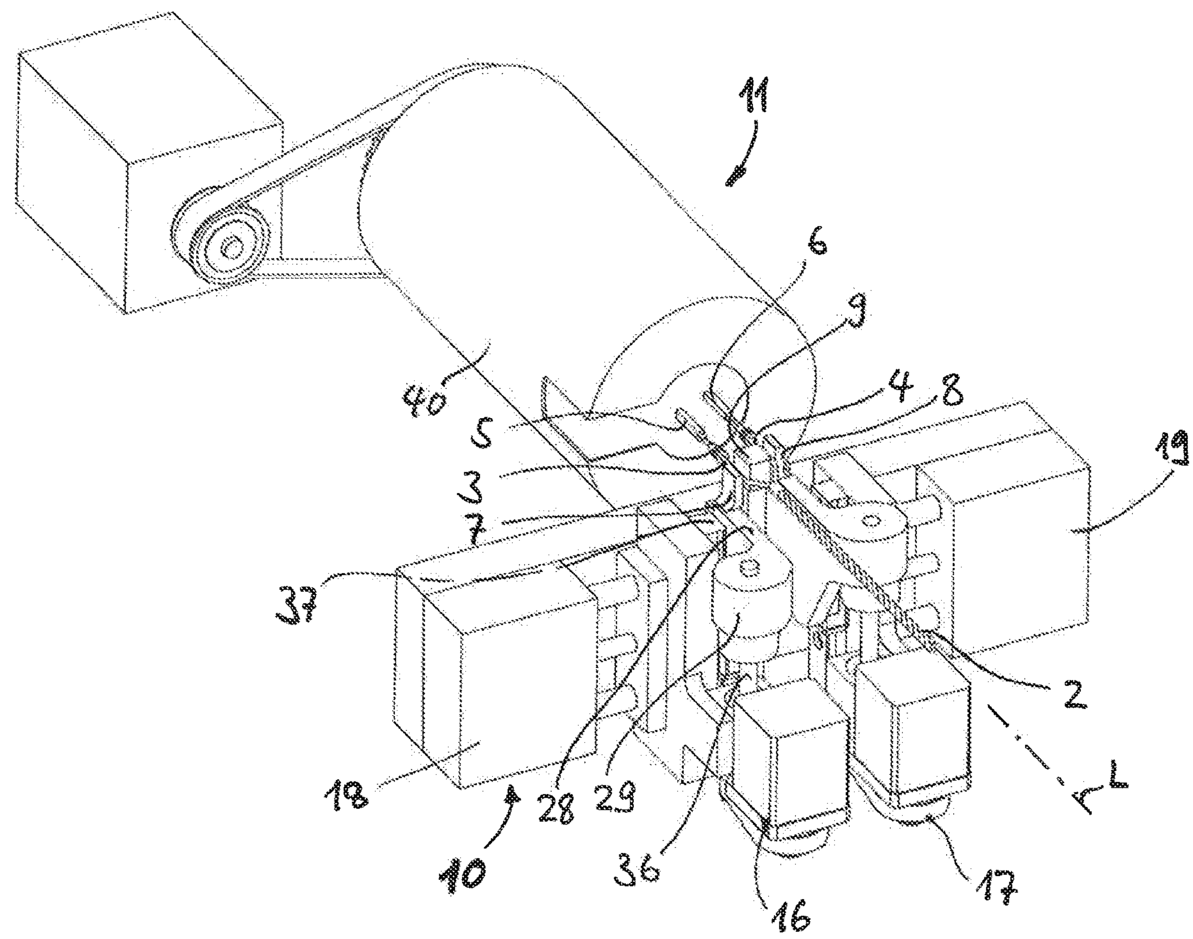
FIG. 7 shows a perspective view of a dual cable alignment apparatus with an optical detection apparatus for determining the rotational positions of the assembled cable ends.

To check whether the assembled cable ends of cables 3, 4 are in the correct rotational position after the alignment procedure, the optical detection apparatus 11 shown in FIG. 7 can be used. However, this optical detection apparatus 11 can also be used to determine the actual states of the cable ends, i.e. the misalignments at the beginning of the alignment procedure (cf. FIG. 3*b*), which are substantially characterized by the angles α1, α2. The optical detection apparatus 11 comprises an image acquisition module having a scanning unit with line sensors. The optical detection apparatus 11 further comprises a cylindrical test head 40, exemplified here, which contains the line sensors and which can be rotated around its axis in a manner known per se. For this purpose, for example, an image capture module can be used, as has already become known from EP 1 304 773 A1. For details on the structure and the basic mode of operation, please refer to this document. The present optical detection apparatus 11 differs from the known detection apparatus primarily in that it is particularly well suited for detecting assembled cable ends of two cables. This aspect will be discussed in detail below, in particular with reference to FIGS. 23 to 25.

After the angular position has been set by the lateral method of the clamping jaw 7, 8, the rotational position of the assembled cable end is checked for each cable 3, 4 using the optical detection apparatus 11 to determine whether the nominal position has actually been adopted. Otherwise, the readjustment procedure must be repeated again.

As can be seen from FIG. 7, the cable alignment apparatus 10 is equipped with linear guides 37 that ensure lateral linear motion with high precision.

Figure 8:
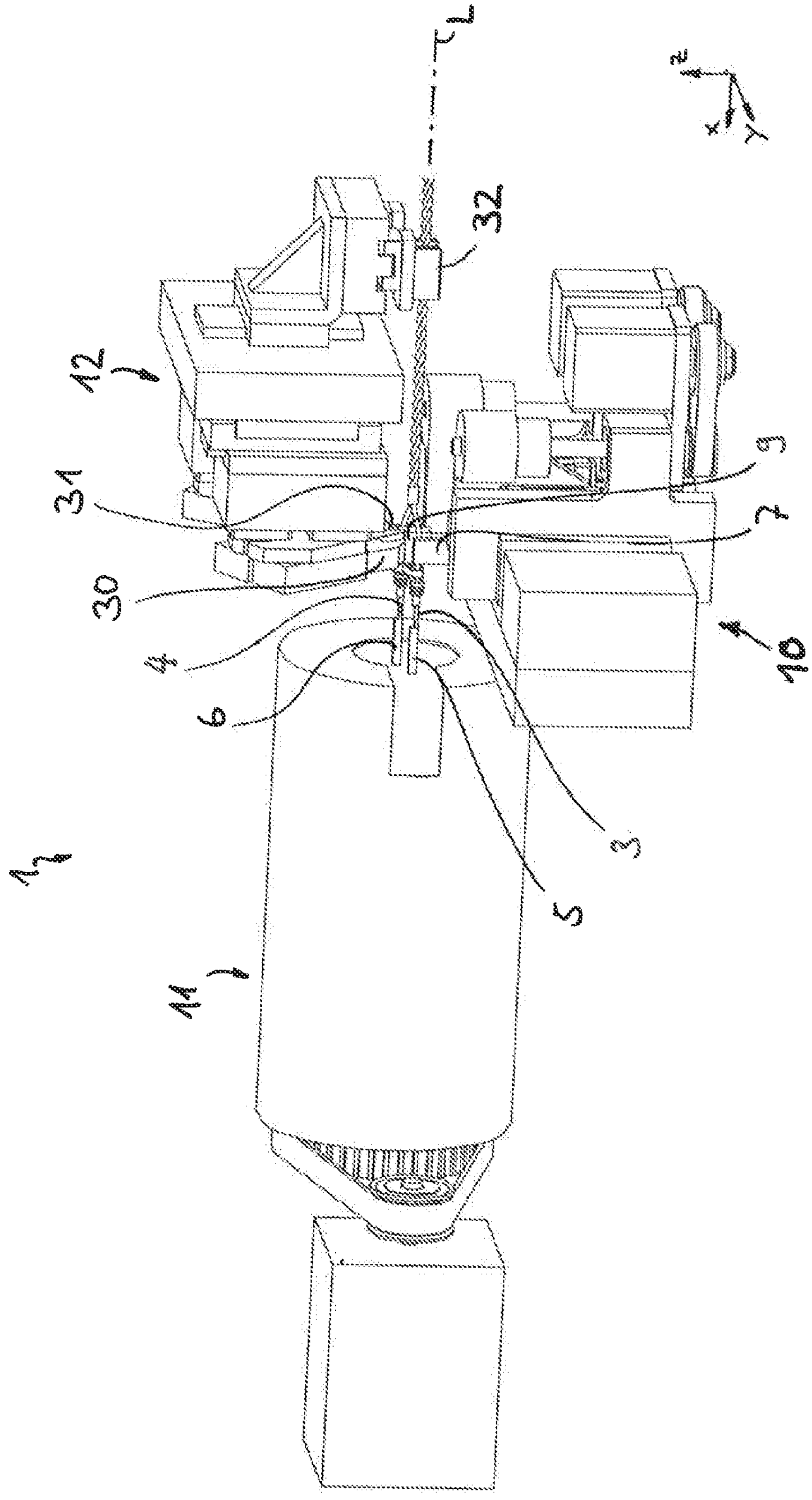
FIG. 8 shows a perspective view of an arrangement with the dual cable alignment apparatus and the optical detection apparatus according to FIG. 7 as well as an assembly gripping unit with two cable grippers.

After completion of the alignment procedure, in which the assembled cable ends of the two cables 3, 4 were aligned in the correct rotational position by means of the dual cable alignment apparatus 10 described above, and the alignment of the assembled cable ends in the correct rotational position is determined or checked by means of the optical detection apparatus 11, the actual assembly can be carried out as the next work step. For assembling, the assembled cable ends of the cables 3, 4 are gripped by an assembly gripping unit 12 and guided to plug housings (not shown), which is shown in FIG. 8. For example, the contact elements 5, 6 are inserted into cells of a plug housing.

The dual cable alignment apparatus 10 is thus, in the present case, a component of an arrangement for handling cables, designated 1, which will be referred to hereinafter as the “assembly arrangement” for the sake of simplicity. The assembly arrangement 1 comprises the dual cable alignment apparatus 10, the optical detection apparatus 11, and the assembly gripping unit 12.

The assembly gripping unit 12 has two cable grippers 30, 31 for gripping the assembled cable ends of cables 3, 4 and for feeding the assembled cable ends, which have been aligned in the correct rotational position, to plug housings. Each of the cable grippers 30, 31 can be controlled individually and can each be moved in the x, y and z directions. The fact that the cable grippers 30, 31 can be moved independently of one another by means of corresponding actuators ensures that the cables, which are usually at different heights after the alignment procedure, can be gripped. A third gripper 32 is also provided for strain relief of the cable harness 2 during assembling.

Figure 9:
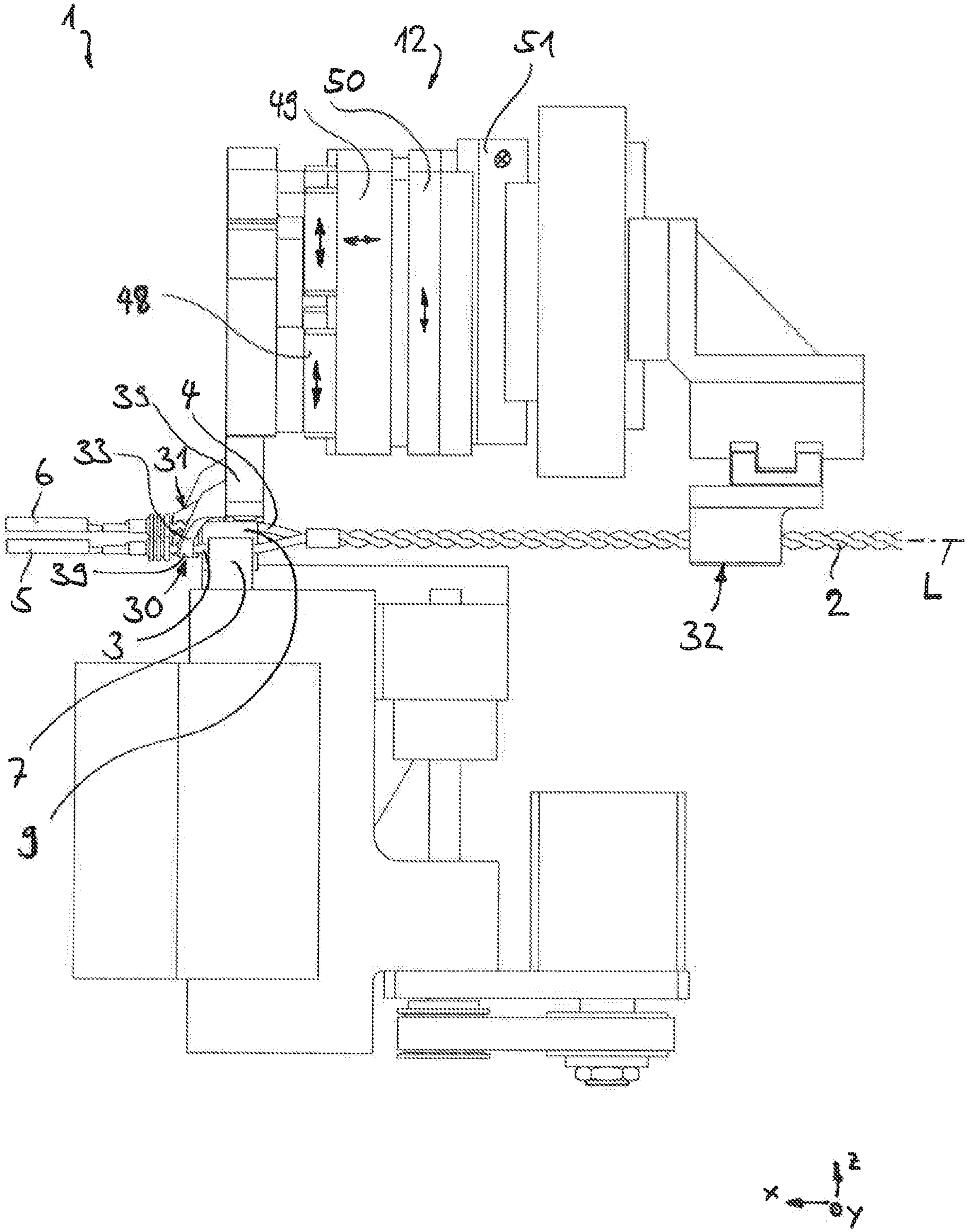
FIG. 9 shows a side view of an arrangement with the dual cable alignment apparatus and the assembly gripping unit with two cable grippers.
Figure 10:
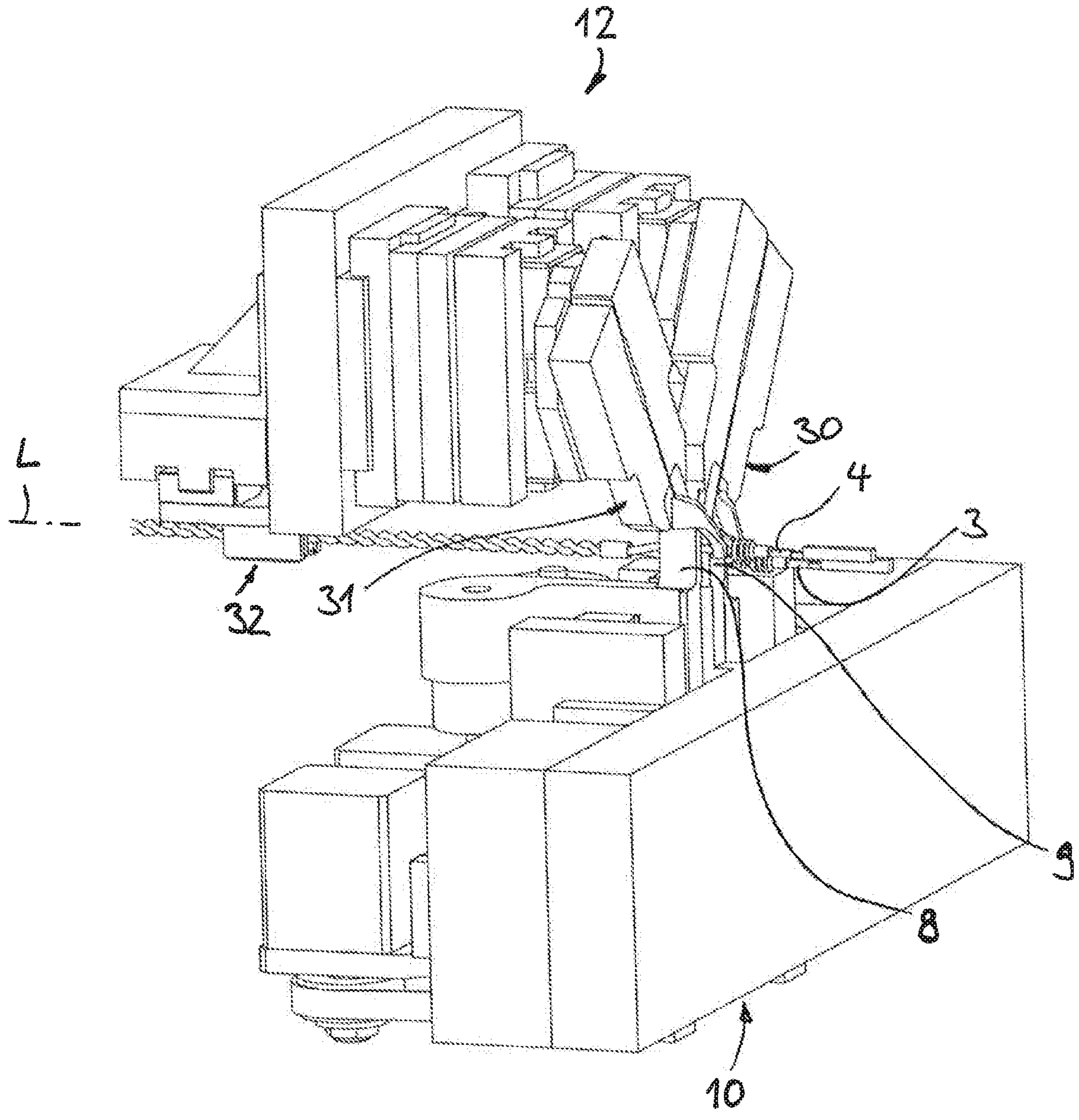
FIG. 10 shows a perspective view of the arrangement according to FIG. 9.

Further details of the assembly gripping unit 12 for the assembly arrangement 1 can be seen in FIGS. 9 and 10. In FIG. 9, for example, the directions of motion of actuators are indicated by double arrows, which can be used to move the cable grippers 30, 31. By means of actuators designated as 50, the cable grippers 30, 31 can be moved up and down in the z direction in order to be able to grip the cables 3, 4 located at different heights. Actuators 49 are used to move the cable grippers 30, 31 in the x direction; actuators 51 are used to move the cable grippers 30, 31 in the y direction. Furthermore, actuators 48 for opening and closing the cable grippers 30, 31 can be seen in FIG. 9.

The cable grippers 30, 31 grip the cables 3, 4 in each case before the components acting on the cables (clamping jaws 7, 8, central web 9). Since these components 7, 8, 9 act on a comparatively large cable portion—with respect to the longitudinal cable axis L—for the cable rolling movements, the cable grippers 30, 31 have only little space to grip the cables 3, 4. Therefore, each of the cable grippers 30, 31 has cranked front parts 33 that connect the respective gripper jaws 38 of the cable grippers to the gripper supports 39. The cranked cable grippers 30, 31 are also clearly visible in FIG. 10.

To ensure reliable rolling movement of the cable during lateral method, the two clamping jaws 7, 8 and the central web 9 can be provided with profiled clamping surfaces. Clamping surfaces with such profiles formed by grooves or slots are shown in FIGS. 11 to 16. In the embodiment example according to FIGS. 11 and 12, the grooves of the profilings extend in the z direction, i.e. at right angles to the longitudinal axis L of the cable alignment apparatus 10. The profiling is formed by grooves extending parallel to one another. The grooves of the clamping surface 20 of the clamping jaw 7 are designated as 24; the grooves of the clamping surface 22 of the central web are designated as 34. The clamping surfaces 21 and 23 associated with the other cable are configured in the same manner. Obviously, the grooves 24, 35 of the opposing clamping surfaces 20 and 22—viewed in the y direction—cover one another. This arrangement can be seen particularly well in FIG. 12. As shown in the following FIG. 16 concerning a further embodiment, the grooves can also be arranged offset from one another in the cable alignment apparatus 10.

Figure 11:
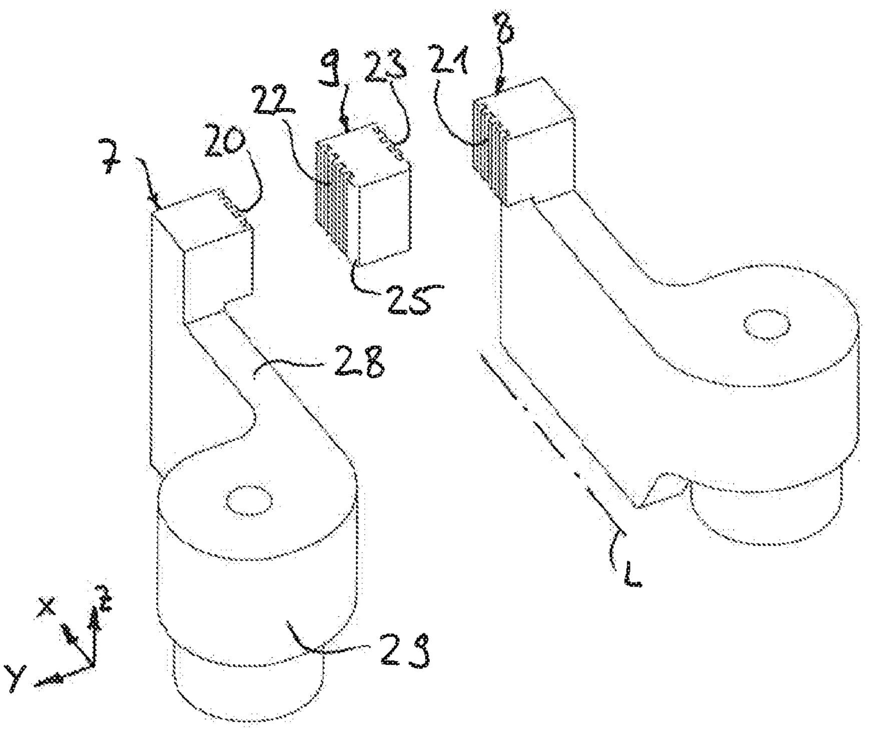
FIG. 11 shows a perspective view of a central web and two clamping jaws for the dual cable alignment apparatus according to another embodiment.

The clamping jaws 7, 8 shown in FIG. 11 are designed as one-piece components. The components, which are preferably made of metallic materials, comprise jaws containing the clamping surfaces 20 or 21, connecting arms 28 and connecting parts 29, wherein the connecting parts 29 form spindle nuts for the previously mentioned threaded rod drives.

Figure 12:
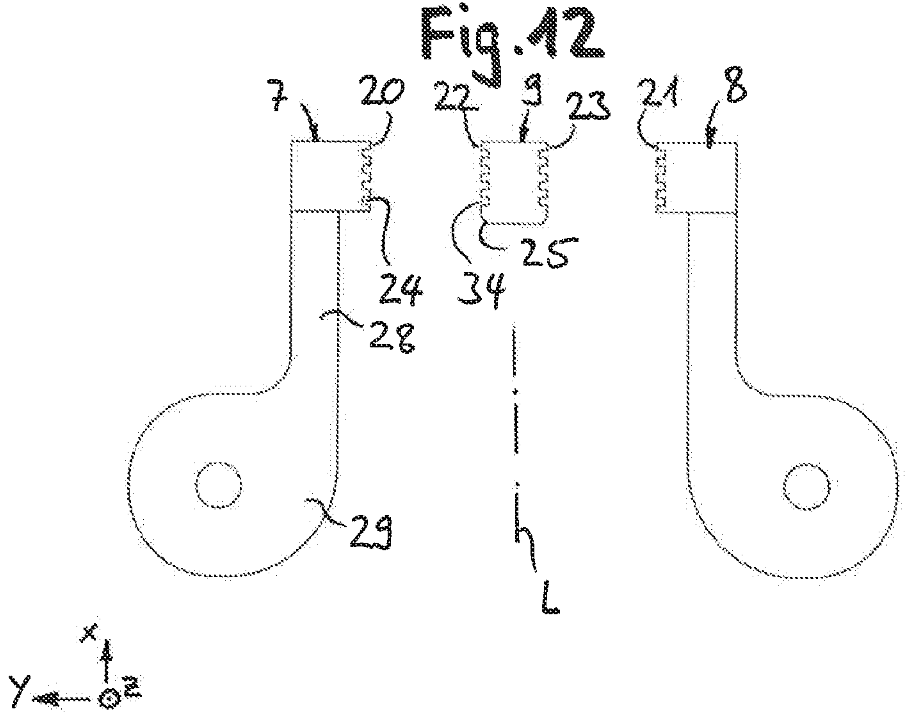
FIG. 12 shows a top view of the central web and the clamping jaws.

It can then be seen from FIGS. 11 and 12 that the central web 9 comprises a tapered inlet portion 25 which is adjacent to the clamping surfaces 22, 23 and faces the twisted area 13 of the cable harness 2. The inlet portion 25 is formed by bevels that create a favorable inlet geometry.

Figure 13:
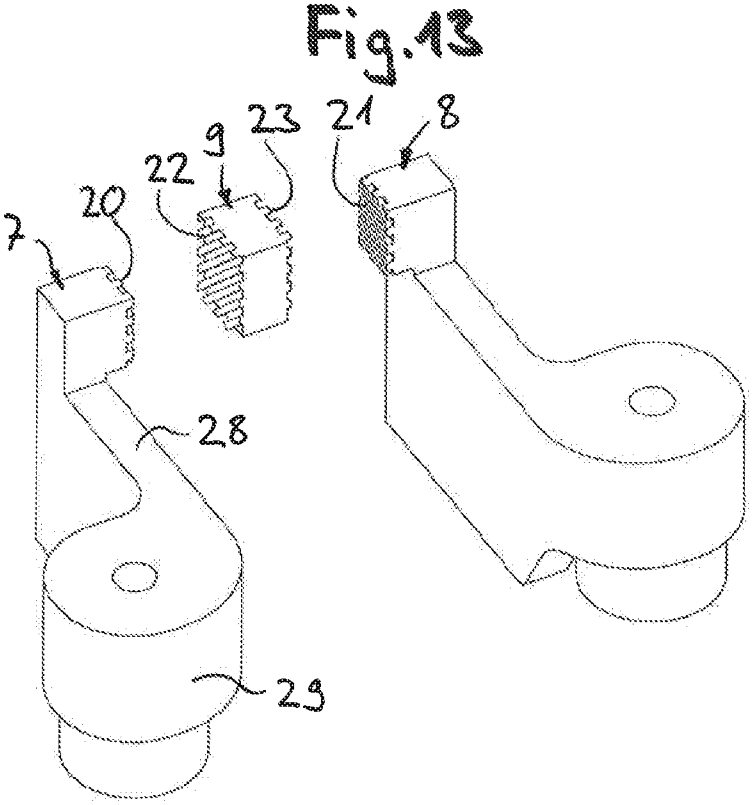
FIG. 13 shows a perspective view of a central web and two clamping jaws for the dual cable alignment apparatus according to another embodiment.
Figure 14:
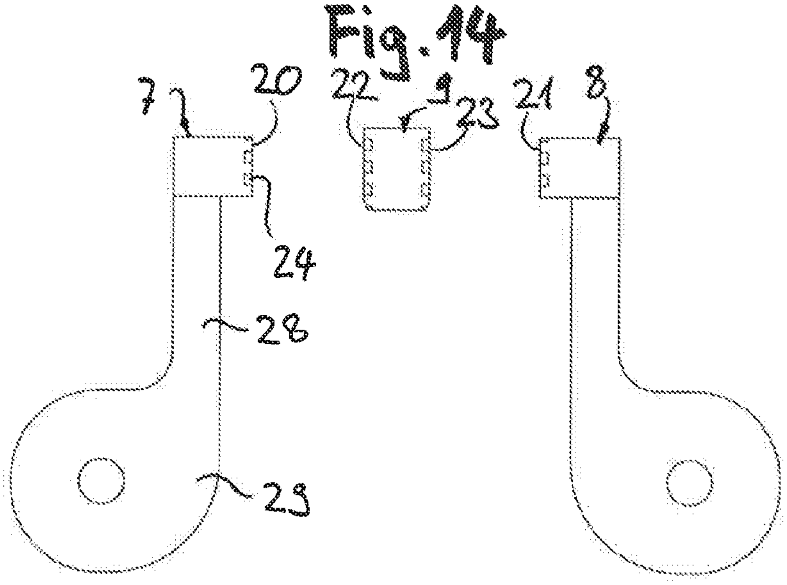
FIG. 14 shows a top view of the central web and the clamping jaws.

FIGS. 13, 14 show an alternative embodiment of the profiling. The profiles of the clamping surfaces 20, 21, 22, 23 of the two clamping jaws 7, 8 and of the central web 9 also extend transversely to the longitudinal axis L, as in the previous embodiment, but here diagonally. As FIG. 13 shows, the diagonally extending grooves 24 of the clamping jaw 7 are oriented at right angles to the grooves 34 associated with the central web 9. The same applies with regard to the clamping jaw 8. Here, too, the grooves of the clamping jaw 8 are oriented at right angles to the grooves associated with the central web.

Figure 15:
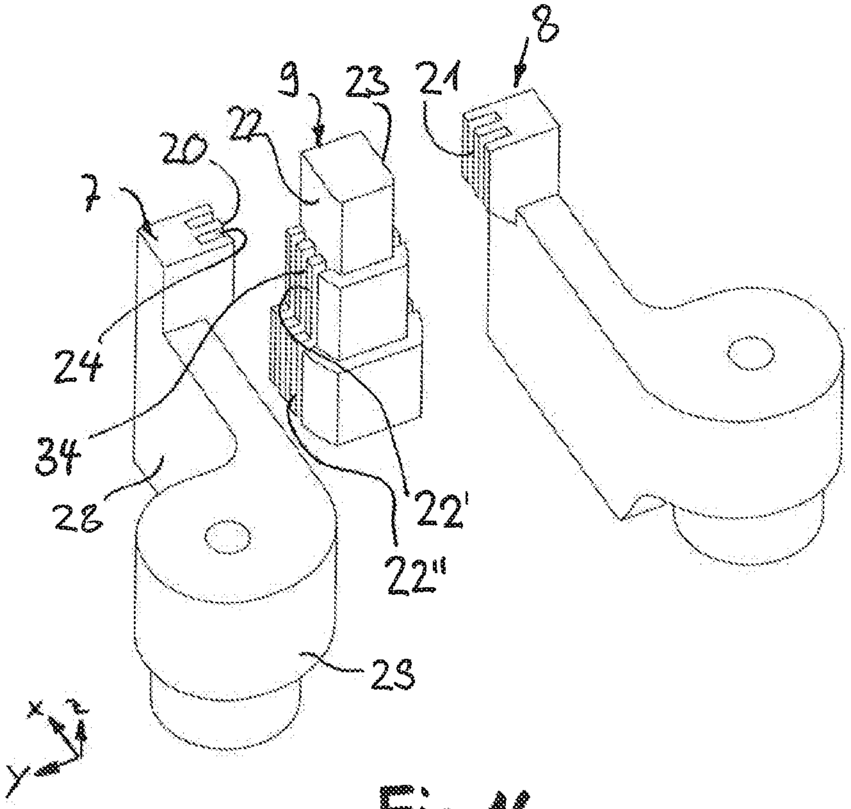
FIG. 15 shows a perspective view of a central web formed as a stepped column and two clamping jaws for another dual cable alignment apparatus.
Figure 16:
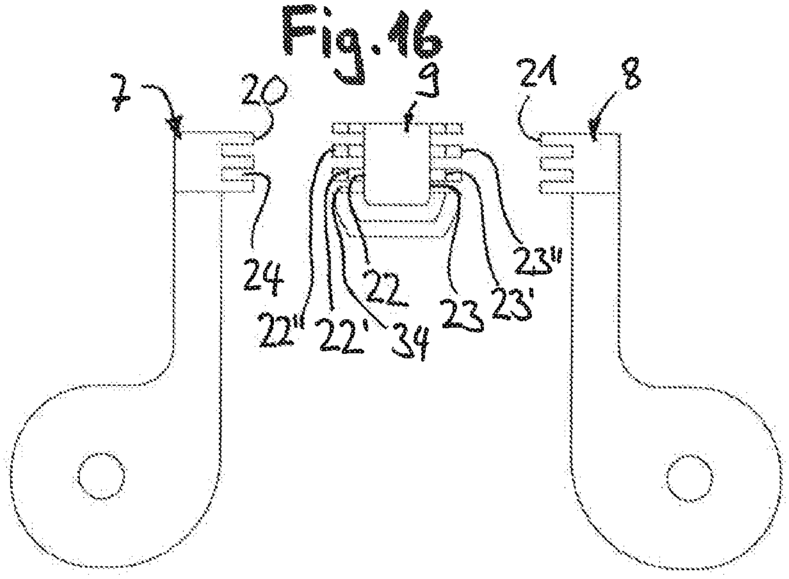
FIG. 16 shows a plan view of the central web, which is formed as a stepped column, and the clamping jaws.

FIGS. 15 and 16 concern another arrangement with clamping jaws 7, 8 and central web 9 for the cable alignment apparatus 10. The central web 9 has web segments separated from one another in a step-like manner for selectively presetting different clamping surfaces 22, 23; 22', 23'; 22", 23". The central web 9 is shaped as a stepped column in relation to a web axis running in the z direction. The clamping surfaces 22, 23 of the first web segment, the clamping surfaces 22', 23' of the second web segment and the clamping surfaces 22", 23" of the third web segment are spaced apart by different distances as can be seen. With such an arrangement, cables of different thicknesses can be aligned in the correct rotational position. By means of a drive not shown here, the central web 9 can be retracted between the clamping jaws 7, 8. The inward and outward motion of the central web 9 would be in the direction of the z axis. In FIG. 15, the clamping jaws 7, 8 are at the level of the first web segment of the central web 9. To move to the next larger level or the level after the next, the central web 9 must be shifted by a corresponding distance in the z direction. The clamping segment of the central web 9 has grooves 34 which cooperate with corresponding grooves 24 of the clamping jaws 7, 8 in such a manner that during an alignment procedure for aligning the assembled cable ends in the correct rotational position, the clamping jaws 7, 8 and the central web 9 can be retracted in a partially interlocking manner during a lateral motion in such a manner that the next larger level does not impede the motion of the clamping jaw 7, 8.

Figure 17:
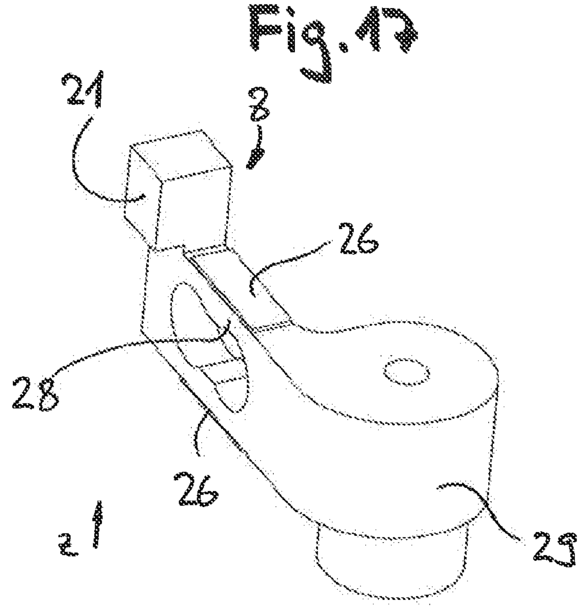
FIG. 17 shows a variant of a clamping jaw for the dual cable alignment apparatus.
Figure 18:
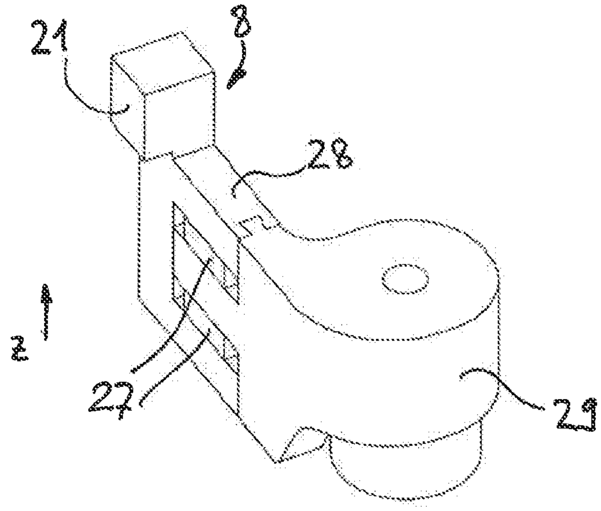
FIG. 18 shows an alternative version of the clamping jaw of FIG. 17.

FIGS. 17 and 18 show a clamping jaw 8 equipped with sensors for determining the torsional moment applied to the cable. Of course, the second clamping jaw is normally configured in the same manner.

Thanks to such sensors, excessive torsion of the cable in the closed position can be prevented during the lateral traversing procedure to change the rotational position and thus undesirable twisting of the cable. In the embodiment shown in FIG. 17, strain gauges arranged on an upper side and a lower side of the connecting arm 28 are arranged as sensors. A recess is provided in the connecting arm 28 to make the deformation more visible to the strain gauges in such a manner that the force can be measured precisely in the z direction. This force can be used to infer the torsion of the cable during alignment. In the alternative embodiment shown in FIG. 18, the connecting arm 28 has integrated pressure sensors 27. The two-part clamping jaw 8 consists of the connecting arm 28 with the jaw formed thereon for predefining the clamping surface 21 and of the connecting part 29. The deformation of the gripper jaw 8 in the z direction can alternatively be determined, for example, by an actual/target comparison of the clamping surfaces of the outer jaws. The position of the clamping surface in the Z direction is measured and compared with the nominal position.

It may be that the measured deformation or force only allows a limited direct conclusion on the torsion of the cable end. Clamping the cable can deform the insulation, which causes the insulation to roll when the clamping jaw is moved in the z direction. In addition to the torsional moment of the cable, the fulling resistance can therefore also act against the force of the clamping jaw (force in the z direction). Such phenomena and how they can be countered are shown in FIGS. 19*a* to 19*d*, although this is explained here using the example of cable 3 on the left in the figures.

Figure 19A:
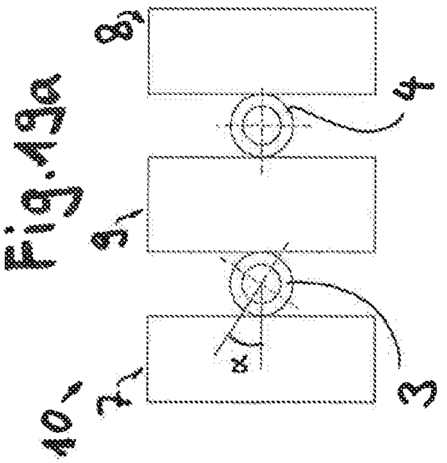
FIG. 19 shows schematic front views of the dual cable alignment apparatus in various positions.
Figure 19B:
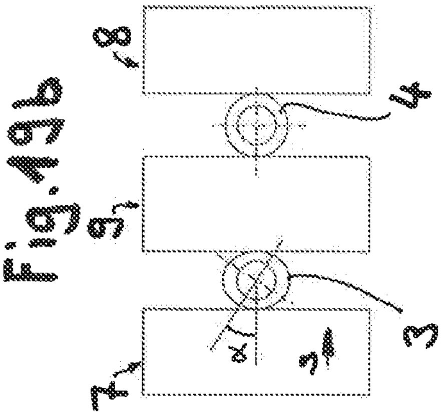
Figure 19C:
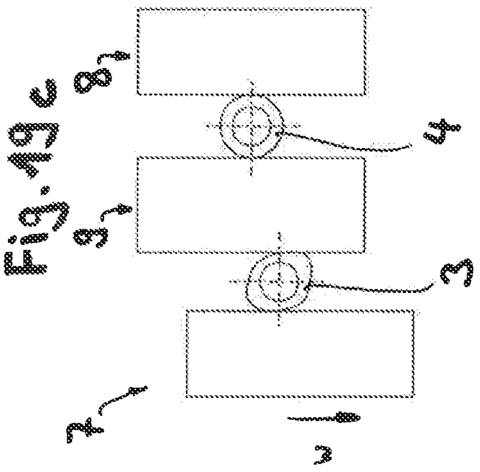
Figure 19D:
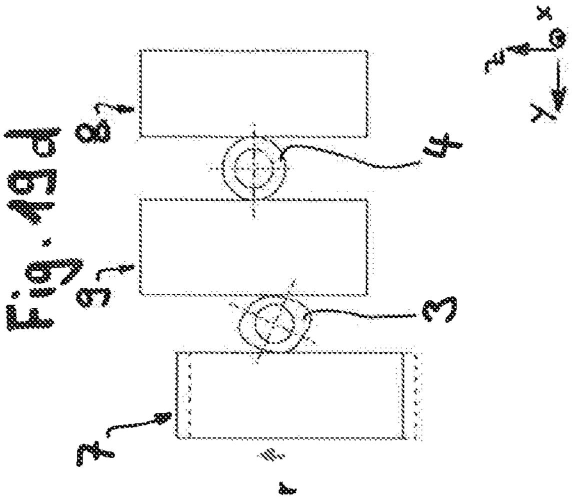

In FIG. 19*a*, the jaws 7, 8 are in the closed position where the jaw 7 is in contact with the cable 3. If the clamping jaw 7 is now moved further in the direction of the arrow s, the insulation of the cable sheath of the cable 3 is deformed (FIG. 19*b*). When the clamping jaw 7 is moved laterally in the direction of the arrow w, the cable 3 is set into a rolling motion during which fulling takes place. As FIG. 19*c* shows, the cable can be brought into the correct rotational position in spite of the flexing.

Another way provides for the clamping jaw 7 to be moved briefly in the opposite direction. This counter-motion is indicated by the arrow r in FIG. 19*d*. Since the flexing resistance always acts in the opposite direction to the direction of motion, the fulling resistance can be eliminated by moving back briefly. The retraction of the clamping jaw serves to isolate the torsional moment of the cable from the flexing resistance. This results in a sequence according to FIGS. 19*a*, 19*b*, 19*c* and 19*d*. If a threshold value for the force in the z direction is exceeded (FIG. 19*c*), the reverse motion (FIG. 19*d*) is triggered. After retraction, the motion can be continued in the w direction (cf. FIG. 19*c*). There may be a very small area where only the torsional moment of the cable 3 acts. What can always be seen, however, is a clear drop in the amount of force (i.e., a drop in F) and, as the return travel continues, a curve offset by twice the amount of flexing resistance.

Resistance from walking can be quantified in two ways.

Figure 20:
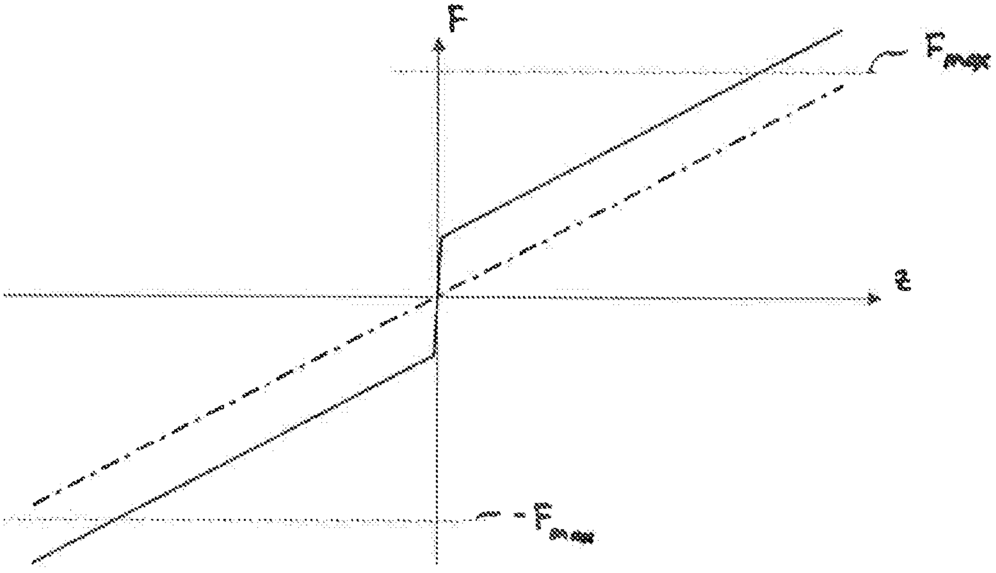
FIG. 20 shows a force/path curve.

First, the offset of the force/displacement curve can be considered. Such a force/path curve is shown in FIG. 20.

Figure 21:
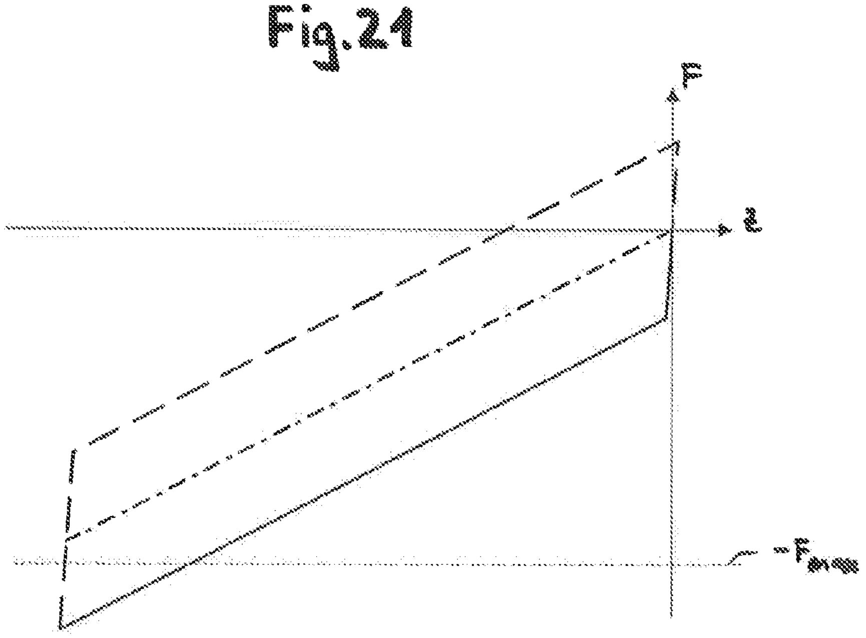
FIG. 21 shows an alternative force/path curve.

Since the theoretical force/path curve of the cable (dash-dotted line) passes through the zero point, the offset is largely attributable to the fulling resistance. This is substantially the same as the sequence shown in FIGS. 19*a*, 19*b*, and 19*c*. A force/path curve for the sequence in accordance with FIGS. 19*a*, 19*b*, 19*c* and 19*d* is shown in FIG. 21. The outward journey is represented by a solid line and the return journey by a dashed line.

Figure 22:
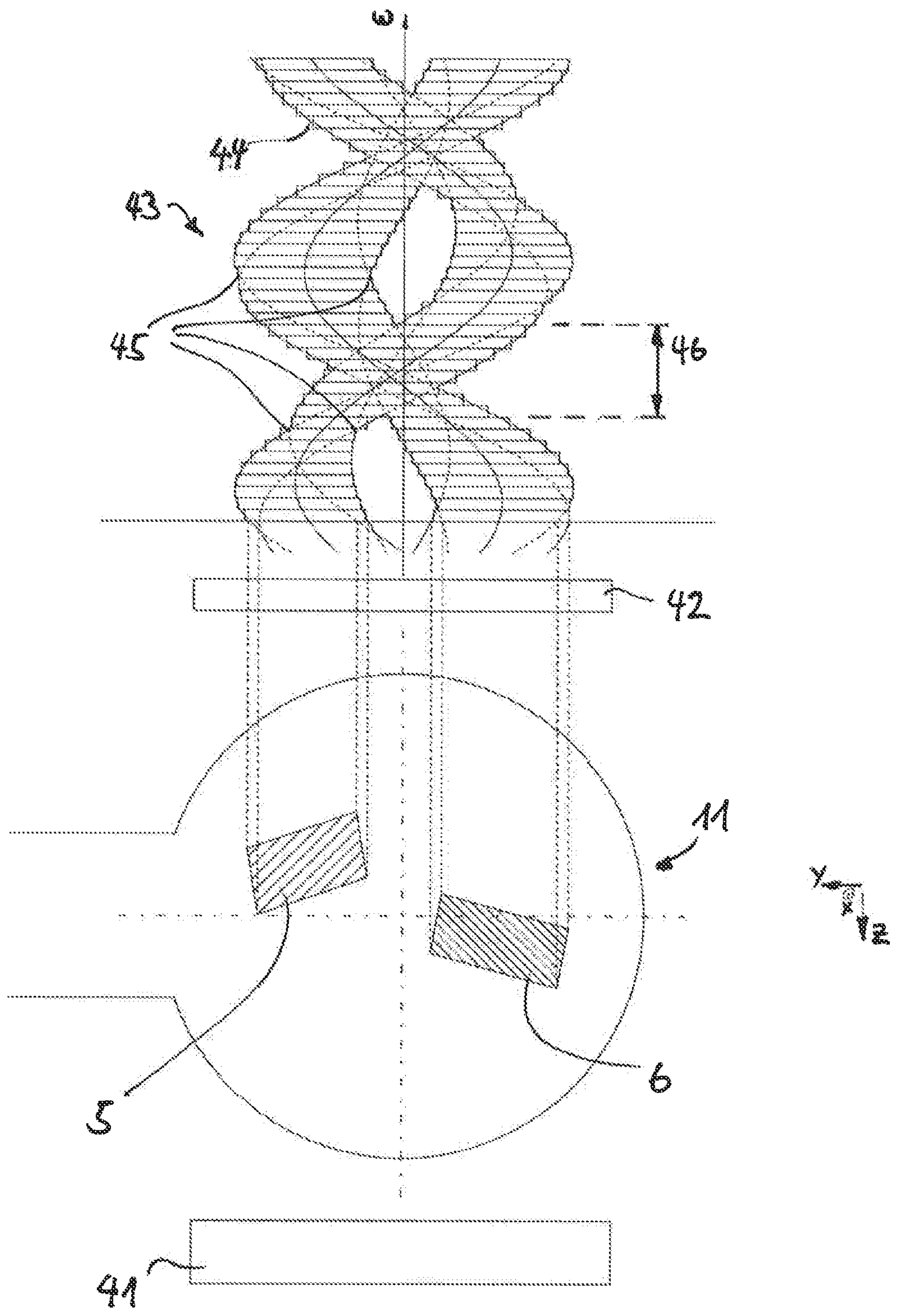
FIG. 22 shows a simplified representation of a test situation for determining the rotational position of assembled cable ends with a shadow image, FIG. 23*a/b* shows a simplified representation of the test situation with a shadow image when a contact part is rotated.

The rotational position of the assembled cable ends is monitored by means of an optical detection apparatus 11, which uses a shadow image of the two contact elements 5, 6 of the cable ends 14, 15 to detect the position. FIG. 22 shows an example of a test situation with a shadow image. The optical detection apparatus 11 comprises a light curtain 11 and a line sensor 42 opposite thereto. Between them are the assembled cable ends of the two cables, wherein the contact elements 5 and 6 are shown simplified as almost rectangular cross-sectional areas. In the present embodiment, the contact elements 5 and 6 have a diamond-shaped outer contour; in other words, the cross-sections of the contact elements 5 and 6 are drawn as parallelograms. The parallelograms are obviously not perpendicular to the light curtain, which is close to a real situation where the cable ends may be slightly tilted. The optical detection apparatus 11 is rotatable around an axis of rotation extending in the direction of the x axis. The line sensor 42 captures an image after each rotation of the optical detection apparatus 11, resulting in the composite shadow image shown in FIG. 22. The axis of the shadow image, denoted by w, corresponds to the angle of rotation of the optical detection apparatus 11.

For example, the method for aligning assembled cable ends of two cables of the UTP cable in the correct rotational position may be as follows: The finished UTP cable is inserted into the cable alignment apparatus 10 and at the untwisted cable ends the cables are clamped by the clamping jaws 7, 8 in the manner described above (closed position). For strain relief, the twisted area of the cable can be kept at a certain distance from the arrangement with the clamping jaws 7, 8 and the central web 9. The optical detection apparatus 11 is then moved to a test position (see previous FIG. 7). There, the optical detection apparatus 11 rotates the test head 40 around the contact elements 5, 6 and checks the rotational position of the contact elements. The test head 40 has the light curtain 41 and the associated line sensor 42 to generate shadow images of the contact elements 5,6. As the test head 40 rotates around the contact elements 5, 6, the captured shadow images are recorded. 44 indicates the shadow edges of the contact elements illuminated in this manner.

In a manner known per se, the shadow contour is examined for local minima 45 in order to determine the rotational position of the contact elements 5, 6. However, since there are now two contact elements 5, 6, the two shadow contours 43 overlap when the test head 40 rotates around the contact elements 5, 6. In accordance with a start position, however, the shadow edges can be assigned to the contact elements 5, 6. The area of anticipated overlap is excluded from the analysis. This is the range of angles of rotation of the test head 40 in which the contact elements 5, 6 are expected to lie on top of one another (from the point of view of the line sensor). This overlap area is designated as 46 in FIG. 22.

If the contact elements 5, 6 extend approximately parallel to the axis of rotation of the test head 40 and have a rectangular cross-section in the sectional plane of the light curtain 41, then the minima 45 of a contact part 5, 6 are offset from one another by 90°. In this ideal situation, the local minima repeat after 180°. Therefore, it is not necessary to search the whole area of 360° for the minima. If the contact elements 5, 6 with rectangular cross-section extend at a small angular amount (e.g. 5°) to the axis of rotation of the test head 40, the acquired cross-section may be distorted a little to a parallelogram if the tilting axis is diagonal.

As long as the minima 45 do not move too far away from 90°, this case can be compensated by the tolerance range of the cable alignment apparatus 10.

If the cross section of the rectangular contact element is strongly distorted to a parallelogram, the current rotation position can also be calculated. The subsequent assembling process could possibly be impeded by a bent cable tip and the preceding machining process therefore has a defect. Therefore, an error message is often preferred.

Figure 23A:
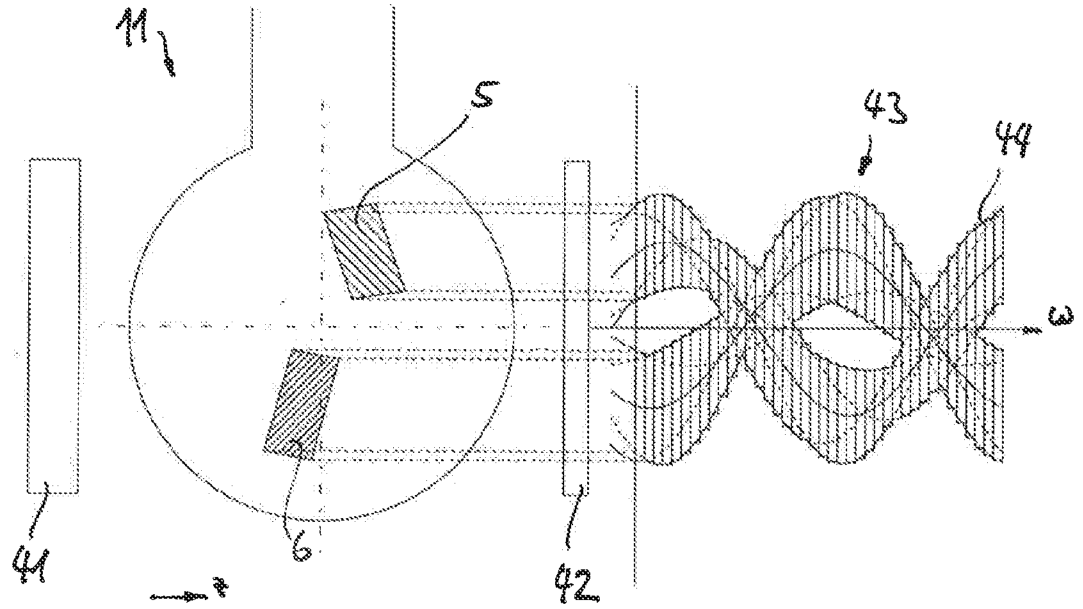
Figure 23B:
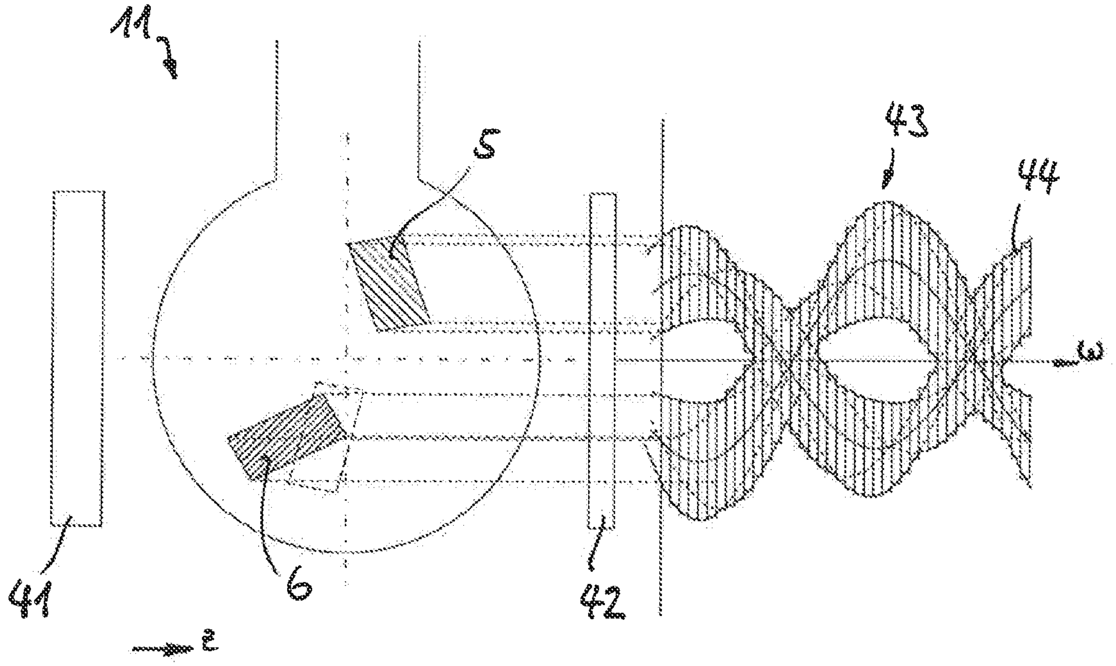
Figure 24:
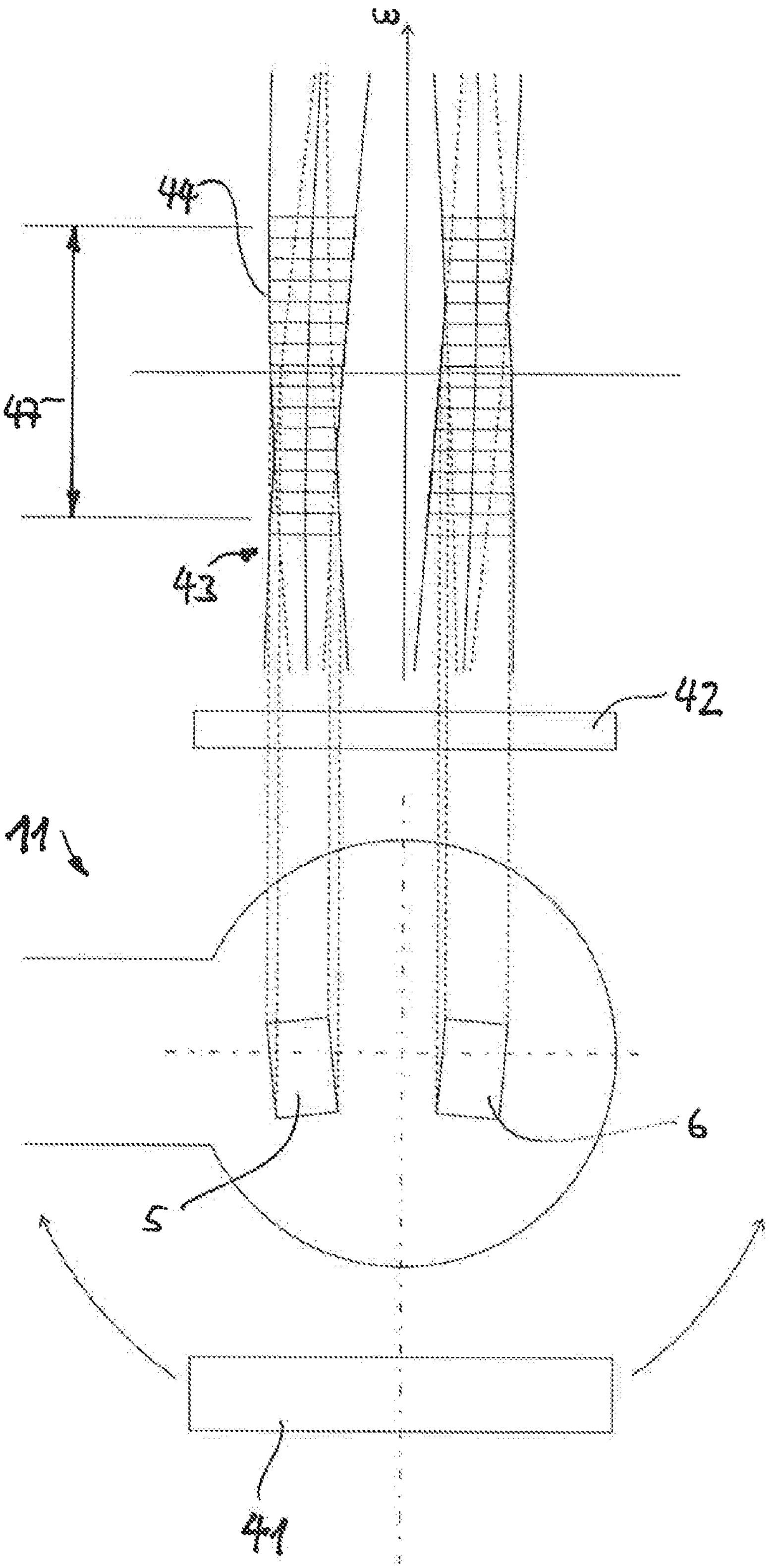
FIG. 24 shows a simplified representation of a test situation with shadow image according to a preferred embodiment with pre-aligned contact elements.

If there are problems in the detection of the minima 45, the affected contact element 5, 6 can be rotated a small amount by the cable alignment apparatus and the test head 40 scans the new shadow contour. The shadow contour of the rotated contact element 5, 6 has changed shape, shifting along the angular axis of the shadow diagram. This is shown in FIGS. 23 and 24. If a minimum 45 was in the area of overlap, it would now step out of it.

To shorten the test time, it is also conceivable that the test head 40 includes a (not shown) second light curtain with associated line sensor, wherein this second light curtain would be positioned offset by 90° from the first light curtain.

The cable alignment apparatus 10 rotates the cable ends to the desired angular position after testing. At the end of the alignment procedure, the contact elements 5, 6 can be rotated differently in relation to one another, depending on the slots provided.

After completion of the alignment in the correct rotational position, the assembly gripping unit 12 comprising two individually controllable cable grippers 30, 31 grips the cable ends at their respective z positions and the optical detection apparatus is moved away from the test position. Before or during moving away, scanning of the contact elements 5, 6 is performed to determine the positions of the tips of the contact elements in a known manner. Then the cable grippers 30, 31 insert the contact elements 5, 6 into the designated slots or cells on the plug housing, adapting the assembling procedure to the positions of the tips.

In another preferred embodiment of the alignment process, the contact elements can be fed to the cable alignment apparatus 10 in a pre-aligned manner. Thanks to this measure, the angular range by which the cable alignment apparatus 10 must be able to rotate the contact elements 5, 6 can be reduced to ±20°. The examination area of the test head 40 can also be reduced, since—as shown in FIG. 25—with pre-aligned contact elements 5, 6 a local minimum 45 per contact part is sufficient to determine the rotational position. In this manner, contact elements 5, 6 with an asymmetrical cross-section can also be easily processed.

The invention claimed is:

1. Cable alignment apparatus for aligning assembled cable ends of two cables of a cable harness, in a correct rotational position, comprising the cable alignment apparatus:

two clamping jaws and a central web arranged between the clamping jaws, wherein one cable of the two cables can be clamped between the central web and one of the clamping jaws, and wherein for changing the rotational position at least one of the clamping jaws is movable laterally past the central web, wherein laterally is a direction that is transverse to a longitudinal axis of the cable alignment apparatus as well as transverse to a closing direction of the clamping jaws.

2. Cable alignment apparatus according to claim 1, wherein a separate lateral drive is provided for at least one of the clamping jaws.

3. Cable alignment apparatus according to claim 1, wherein the clamping jaws and the central web each have clamping surfaces running parallel to one another, wherein the clamping surfaces are profiled and wherein the clamping surfaces are each provided with a profiling formed by grooves or slots.

4. Cable alignment apparatus according to claim 3, wherein the clamping jaws and the central web are made of metallic materials which are roughened in the area of the clamping surfaces or that the clamping jaws and the central web are coated in the area of the clamping surfaces.

5. Cable alignment apparatus according to claim 1, wherein the central web comprises a tapering inlet portion adjoining a clamping surface.

6. Cable alignment apparatus according to claim 1, wherein the central web has web segments separated from one another in a step-like manner for selectively presetting different clamping surfaces.

7. Cable alignment apparatus according to claim 6, wherein at least one clamping segment of the central web has grooves or slots which cooperate with corresponding grooves or slots of the clamping jaws in such a manner that, during a lateral motion, the clamping jaws and the central web can be retracted in a partially interlocking manner.

8. Cable alignment apparatus according to claim 1, wherein the clamping jaws and/or the central web are equipped with sensors for determining the torsional moment applied to the clamped cable.

9. Cable alignment apparatus according to claim 1, further comprising an optical detection apparatus for determining the respective rotational position of the cables.

10. Arrangement for handling cables, having a cable alignment apparatus according to claim 1 for aligning assembled cable ends of two cables of a cable harness in a correct rotational position and an assembly gripping unit with two individually controllable cable grippers for gripping and feeding to plug housings or to cells of a plug housing the assembled cable ends of the cables aligned in the correct rotational position.

* * * * *